United States Patent
Tanaka

(10) Patent No.: US 11,949,835 B2
(45) Date of Patent: Apr. 2, 2024

(54) INFORMATION PROCESSING SYSTEM, INFORMATION PROCESSING METHOD, AND COMMUNICATION APPARATUS

(71) Applicant: CANON KABUSHIKI KAISHA, Tokyo (JP)

(72) Inventor: Yuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,443

(22) Filed: Jun. 24, 2022

(65) Prior Publication Data

US 2023/0007141 A1 Jan. 5, 2023

(30) Foreign Application Priority Data

Jul. 1, 2021 (JP) ................................. 2021-110124

(51) Int. Cl.
*G06F 3/12* (2006.01)
*G06F 16/955* (2019.01)
*H04N 1/32* (2006.01)

(52) U.S. Cl.
CPC ..... *H04N 1/32106* (2013.01); *G06F 16/9554* (2019.01); *H04N 2201/3205* (2013.01)

(58) Field of Classification Search
CPC ....... H04N 1/32106; H04N 2201/3205; H04N 2201/3208; G06F 16/9554
See application file for complete search history.

(56) References Cited

U.S. PATENT DOCUMENTS

| | | | |
|---|---|---|---|
| 9,554,000 B2 | 1/2017 | Kawai | H04N 1/00204 |
| 2017/0063646 A1* | 3/2017 | Kawai | G06Q 10/10 |
| 2017/0178225 A1* | 6/2017 | Suzuki | H04N 1/00344 |
| 2019/0007404 A1* | 1/2019 | Igari | G06F 21/608 |
| 2020/0007701 A1* | 1/2020 | Kawahata | G06F 3/1204 |
| 2020/0073608 A1 | 3/2020 | Tanaka | G06F 3/12 |
| 2020/0076978 A1* | 3/2020 | Kawahata | H04N 1/00925 |

FOREIGN PATENT DOCUMENTS

JP 2016-194776 11/2016

* cited by examiner

*Primary Examiner* — Moustapha Diaby
(74) *Attorney, Agent, or Firm* — Venable LLP

(57) ABSTRACT

A second management server includes: a reception unit configured to receive a request of notification information, which includes identification information identifying the communication apparatus, from the first management server; a generation unit configured to generate a URL for service registration, which includes the identification information, in a case where the request is received; a transmission unit configured to transmit reply information, which includes the generated URL, to the first management server as a response to the request; and a second transmission unit configured to transmit a request of registration with the service, which is based on the identification information, to the service provider server in response to an access to the URL.

15 Claims, 20 Drawing Sheets

| SERIAL NUMBER | MODEL NAME | SERVICE A REGISTRATION STATUS | SERVICE B REGISTRATION STATUS | PRODUCT DELIVERY |
|---|---|---|---|---|
| SN1234 | PR01 | NOT REGISTERED | NOT REGISTERED | JP |
| | | | | |
| | | | | |

FIG.6A

| SERIAL NUMBER | MODEL NAME | SERVICE A REGISTRATION STATUS | SERVICE B REGISTRATION STATUS | PRODUCT DELIVERY |
|---|---|---|---|---|
| SN1234 | PR01 | REGISTERED | NOT REGISTERED | JP |
| | | | | |
| | | | | |

| MODEL NAME | DELIVERY | NOTIFICATION ID |
|---|---|---|
| PR001 | JP | N001 |
| PR001 | US | N002 |
| PR001 | JP | N003 |
| PR002 | JP | N001 |
| PR002 | JP | N003 |

| NOTIFICATION ID | SERVICE | DISPLAY TIMING | DISPLAY FORMAT | DISPLAY START | DISPLAY END |
|---|---|---|---|---|---|
| N001 | Service A | POWER-ON | Type1 | 2020/08/01 00:00 | 2020/08/31 12:00 |
| N002 | Service B | AT PRINTING COMPLETE | Type2 | 2020/08/10 00:00 | 2020/08/20 12:00 |
| N003 | Service C | POWER-ON/ AT PRINTING COMPLETE | Type1 | 2020/09/01 00:00 | 2020/09/20 12:00 |

INFORMATION PROCESSING SYSTEM, INFORMATION PROCESSING METHOD, AND COMMUNICATION APPARATUS

BACKGROUND OF THE INVENTION

Field of the Invention

The present disclosure relates to a technique of registering a communication apparatus with a service.

Description of the Related Art

As a Web service using the Internet, there appears a system in which a communication apparatus notifies a Web server of information for printing and the Web server gives a point based on the information. In a case of the registration with such a Web service, specific identification information of the communication apparatus needs to be registered with the server in association with a user account. Japanese Patent Laid-Open No. 2016-194776 (hereinafter, referred to as PTL 1) describes a technique of registering a user account and a communication apparatus with a server.

However, in the technique of PTL 1, the user needs to manually input the information identifying the communication apparatus in a case of registering the communication apparatus with the server.

SUMMARY OF THE INVENTION

An information processing system according to one aspect of the present disclosure is an information processing system, including: a communication apparatus; a first management server configured to manage status information transmitted from the communication apparatus through a network; a service provider server configured to provide a service based on the status information; and a second management server configured to perform registration with the service. Here, the second management server includes a reception unit configured to receive a request of notification information, which includes identification information identifying the communication apparatus, from the first management server, a generation unit configured to generate a URL for service registration based on the identification information in a case where the request is received, a transmission unit configured to transmit reply information, which includes the generated URL, to the first management server as a response to the request, and a second transmission unit configured to transmit a request of registration with the service, which includes the identification information, to the service provider server in response to an access to the URL.

Further features of the present invention will become apparent from the following description of exemplary embodiments with reference to the attached drawings.

BRIEF DESCRIPTION OF THE DRAWINGS

FIGS. 6A and 6B are diagrams illustrating an example of a printer management table included in a printer management server;

FIGS. 8A and 8B are diagrams illustrating an example of various tables included in the printer management server;

DESCRIPTION OF THE EMBODIMENTS

Preferred embodiments of the present disclosure are described below in detail with reference to the appended drawings. The following embodiments are not intended to limit the matters of the present disclosure, and not all the combinations of the characteristics described in the present embodiments are necessarily required for the means for solving the problems.

First Embodiment

<Configuration of Information Processing System>

Figure 1:
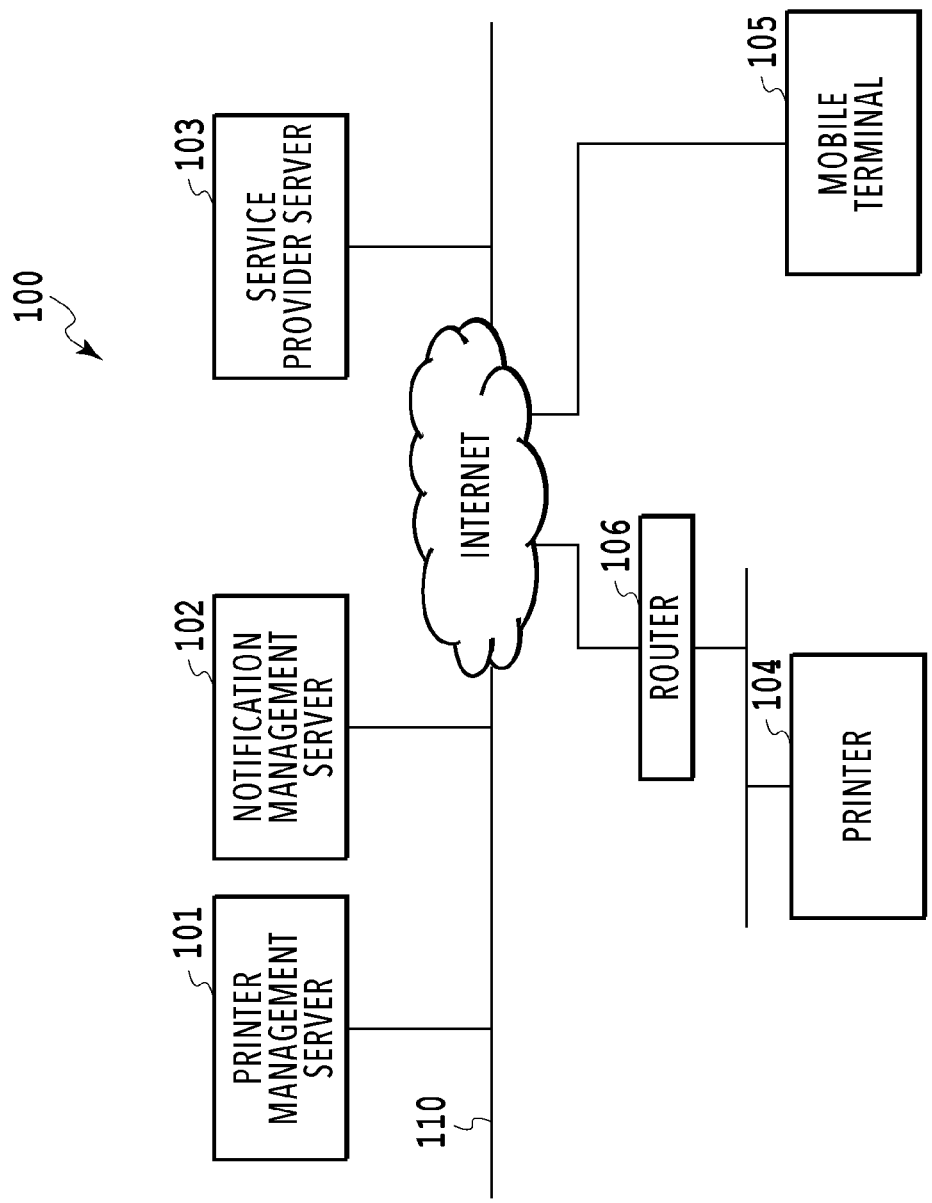
FIG. 1 is a diagram illustrating an example of a configuration of an information processing system.

FIG. 1 is a diagram illustrating an example of a configuration of an information processing system in the present embodiment. An information processing system 100 in the present embodiment includes a printer management server 101, a notification management server 102, a service provider server 103, a printer 104 as a communication apparatus, and a mobile terminal 105 as an information processing apparatus.

Each of the printer management server 101, the notification management server 102, the service provider server 103, and the mobile terminal 105 are connected to the Internet 110. The printer 104 is able to be connected to the Internet through a router 106. The printer management server 101 is able to receive information from the notification management server 102 through the Internet 110 and can transmit the information to the printer 104. The communication between the printer 104 and the printer management server 101 is established by a control by using HTTP, XMPP, or the like. The communication may be established by using another protocol. In the present embodiment, each of the servers, the printer management server 101, the notification management server 102, and the service provider server 103, is a server system including one or more server apparatuses.

In the present embodiment, the service provider server 103 provides various services. For example, the services may include a service to give a point in accordance with the number of sheets printed by a user with a printer that is registered with the service, a service to automatically deliver consumables to the user of the printer registered with the service, and the like. Examples of the services are not limited to the modes, and any service may be applied as long as it is a service that allows for the registration of the printer 104 with the service. If the communication apparatus is not a printer, the service provided by the service provider server 103 may not necessarily be a service related to printing and may be a service depending on the type of the communication apparatus. In the present embodiment, the registration of the printer 104 with a service corresponds to management, by the service provider server 103, of information on the printer 104 and the service as a registration target, in association with each other. In use of a service, for example, the printer 104 periodically transmits status information including various pieces of information such as the number of print sheets and a remaining amount of ink to the printer management server 101 with identification information identifying the printer 104 itself (for example, a serial number of the apparatus). The printer management server 101 transmits the information received from the printer 104 to an appropriate service provider server 103 depending on the service that the printer 104 subscribes (registers). In this case, a separate identification number (in the present embodiment, referred to as a registration ID) different from the identification information (a serial number) of the printer 104 is used between the printer management server 101 and the service provider server 103. This is for responding to a case where a printer that already subscribes the service is transferred to another user, for example. For this reason, in a case where the user receives the service of the service provider server 103 (in other words, in a case of registering with the service), the identification information (a serial number) of the printer 104 and the registration ID need to be associated with each other in the printer management server 101.

In the embodiments described below, there is described an example where it is possible to register the printer 104 (the communication apparatus) by a simple method in a case where the user registers the printer 104 with the service of the service provider server 103.

<Configuration of Server>

Figure 2:
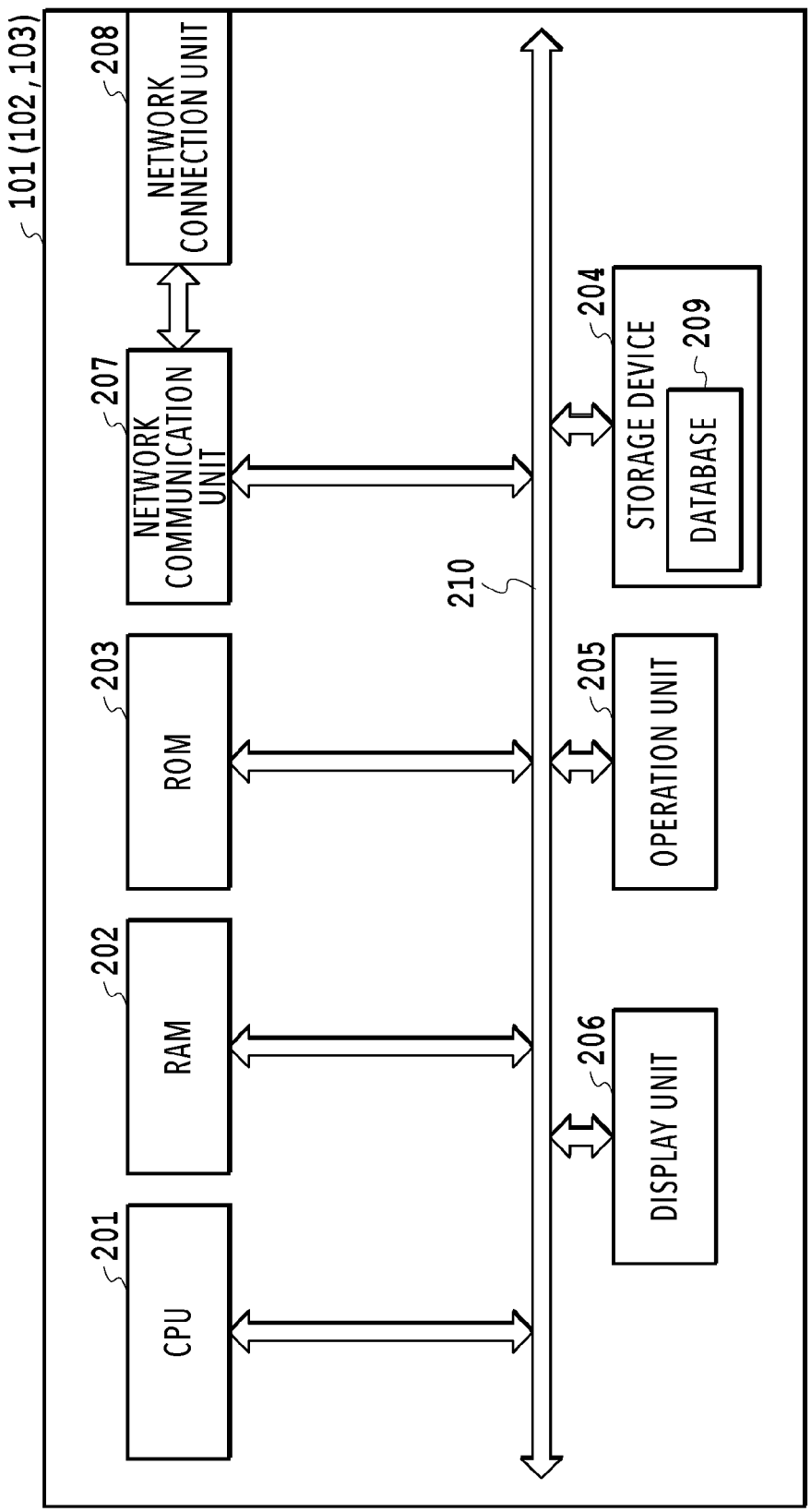
FIG. 2 is a block diagram illustrating an example of a hardware configuration of a server.

FIG. 2 is a block diagram illustrating an example of a hardware configuration of the printer management server 101 in the present embodiment. The printer management server 101 includes a CPU 201, a RAM 202, a ROM 203, a storage device 204, an operation unit 205, a display unit 206, a network communication unit 207, and a network connection unit 208.

The CPU 201 is a central processing unit that controls the units in the printer management server 101. The RAM 202 serves as a working memory that is required in a case of executing a program by the CPU 201. The ROM 203 is a memory dedicated for reading for storing a boot program required to boot a system. The storage device 204 is a device that stores the program executed by the CPU 201 as well as a database 209 and various pieces of information and is, for example, a non-volatile storage device such as a magnetic disk or a flash memory. The operation unit 205 is a keyboard, a mouse, and the like for the user to perform various input operations. The display unit 206 is formed of an LCD, for example. The display unit 206 displays various pieces of information to be presented to the user. The network communication unit 207 is connected with a network such as the Internet 110 through the network connection unit 208 and establishes various communications. The above-described units are connected to each other through a bus 210 and are capable of transmitting and receiving data to and from each other.

The notification management server 102 and the service provider server 103 have the same hardware configuration as that of the printer management server 101; for this reason, the descriptions are omitted. The notification management server 102 or the service provider server 103 may have a hardware configuration different from that of the printer management server 101.

<Hardware Configuration of Printer>

Figure 3:
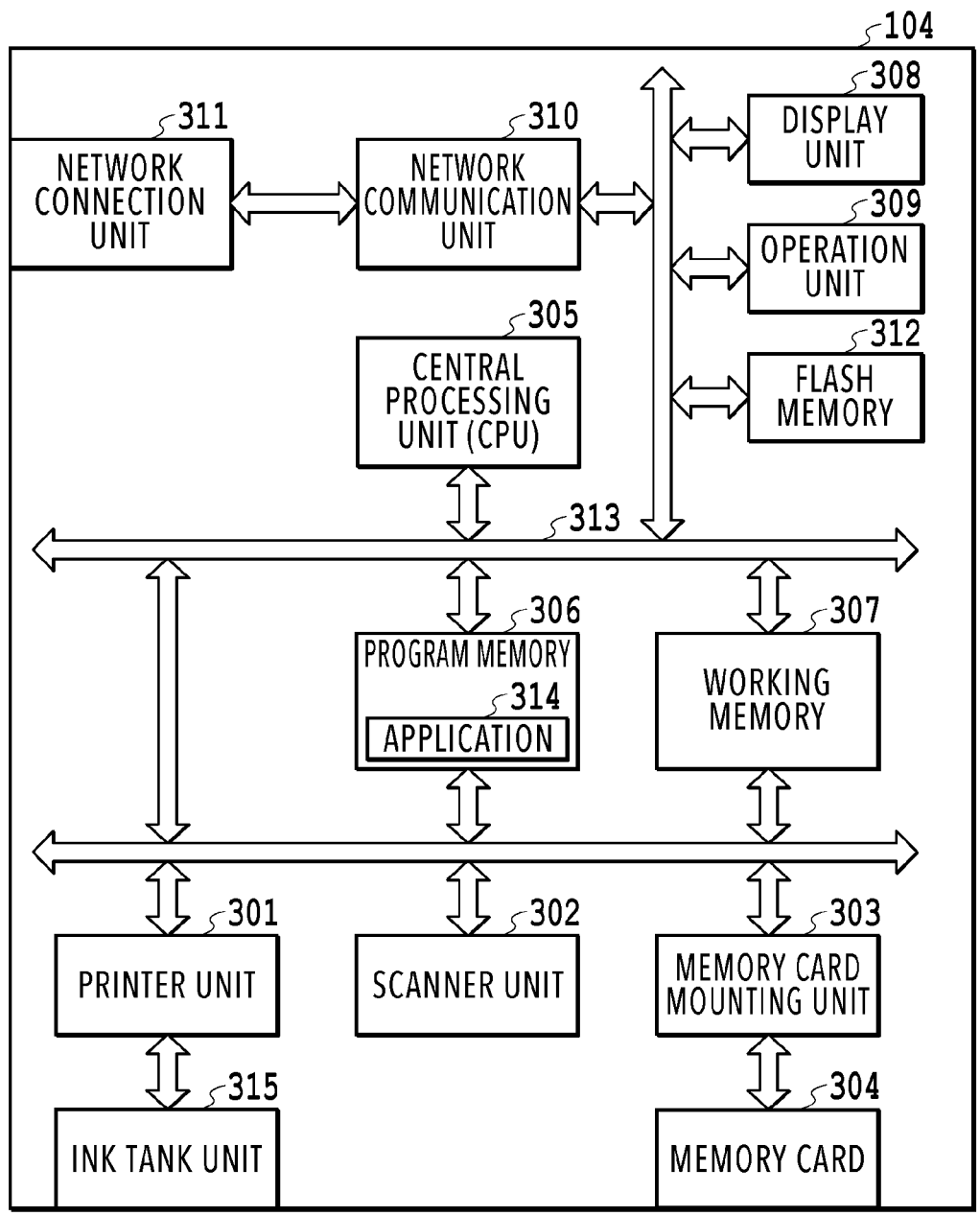
FIG. 3 is a block diagram illustrating an example of a hardware configuration of a printer.

FIG. 3 is a block diagram illustrating an example of a hardware configuration of the printer 104 in the present embodiment. The printer 104 includes a printer unit 301, a scanner unit 302, a memory card mounting unit 303, a memory card 304, and an ink tank unit 315. Additionally, the printer 104 includes a CPU 305, a program memory 306, a working memory 307, a display unit 308, an operation unit 309, a network communication unit 310, a network connection unit 311, and a flash memory 312. In the present embodiment, as an example of the communication apparatus, the printer 104 that is a multifunction apparatus is described for example; however, the communication apparatus to which the present embodiment is applicable is not limited to a printer. As the communication apparatus, a copy machine or a facsimile, a mobile terminal, a smartphone, a laptop PC, a tablet terminal, a PDA, a digital camera, a music player device, a television, a smart speaker, or the like may be used, or a printer with no scanner function may be used.

In the printer 104, the printing function is implemented by the printer unit 301. The scanner function is implemented by the scanner unit 302. The storage function is implemented by the memory card mounting unit 303 and the memory card 304. The printer unit 301 records (that is, prints) an image on a printing medium such as a print sheet by, for example, an ink-jet method based on image data received from the outside, image data stored in the memory card 304, or the like. Additionally, the printer unit 301 manages ink information including information on a remaining amount of ink and sheet information including information on the number of stacked sheets. The printer 104 may be a printer that prints an image by another method such as an electrophotographic method.

The scanner unit 302 optically reads an original document set on a platen (not illustrated) to convert into electronic data and transmits the image data converted into a specified file format to an external apparatus by way of a network or stores the image data into a storage region such as an HDD (not illustrated). The copy function is implemented by transferring the image data, which is generated by reading the original document set on the platen by the scanner unit 302, to the printer unit 301, and then printing the image onto the printing medium by the printer unit 301 based on the image data. Various kinds of file data are stored in the memory card 304 mounted in the memory card mounting unit 303. The file data can be edited by being read from an external apparatus through a network. It is also possible to store the file data into the memory card 304 in response to an instruction from an external apparatus.

The CPU 305 is a central processing unit that controls the units in the printer 104. The program memory 306 is formed of a ROM or the like. The program memory 306 stores various program codes and an application 314 for communication with the printer management server 101. The working memory 307 is formed of a RAM or the like. The working memory 307 temporarily stores image data and the like while each service is executed, or buffering is performed by using the working memory 307. The display unit 308 is formed of an LCD, for example, and displays various pieces of information. The operation unit 309 includes a switch and the like for the user to perform various input operations. The network communication unit 310 is connected with the router 106 through the network connection unit 311. In other words, the network communication unit 310 is connected to a network such as the Internet 110 through the network connection unit 311 and establishes various communications. In the various communications, a control by using HTTP, XMPP, or the like is performed. The protocol is not limited thereto, and another protocol may be used. The flash memory 312 is a non-volatile memory that stores the image data and the like received by the network communication unit 310. The above-described units are connected to each other through a bus 313 and are capable of transmitting and receiving data to and from each other.

<Hardware Configuration of Mobile Terminal>

Figure 4:
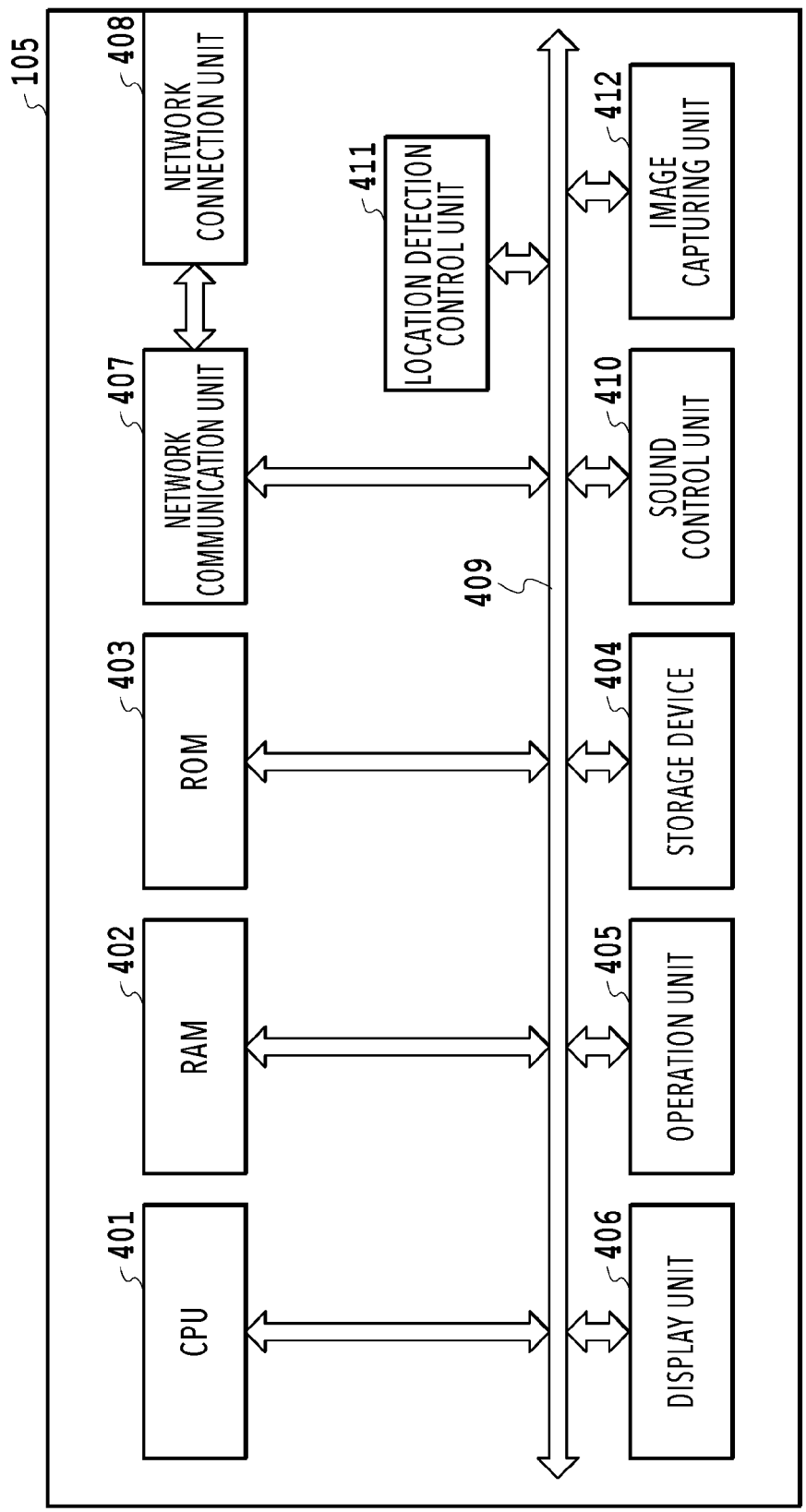
FIG. 4 is a diagram illustrating an example of a hardware configuration of a mobile terminal.

FIG. 4 is a diagram illustrating an example of a hardware configuration of the mobile terminal 105 in the present embodiment. The mobile terminal 105 includes a CPU 401, a RAM 402, a ROM 403, a storage device 404, an operation unit 405, a display unit 406, a network communication unit 407, a network connection unit 408, a sound control unit 410, a location detection control unit 411, and an image capturing unit 412.

The CPU 401 is a central processing unit that controls the units in the mobile terminal 105. The RAM 402 is a working memory required to execute a program by the CPU 401. The ROM 403 stores an operating system, an application that controls phone conversations, a printing application, and the like. Those applications are executed by being read by the CPU 401. The storage device 404 is a non-volatile storage device and stores various kinds of operation mode setting, operation log, and the like that are required to be held also after the mobile terminal 105 is rebooted. The operation unit 405 controls information instructed by the user through a button or a touch panel of the mobile terminal 105. The display unit 406 is formed of an LCD or an OLED, for example, and displays various pieces of information. The network communication unit 407 is connected with the router 106 through the network connection unit 408. In other words, the network communication unit 407 is connected with a network such as the Internet 110 through the network connection unit 408 and establishes various communications. The network communication unit 407 corresponds to a wireless LAN. The network communication unit 407 may be directly connected with a network such as the Internet 110 without using the router 106. The sound control unit 410 is mainly booted by a phone conversation application and is used in a case where the user makes a phone call. Sound data is inputted and outputted through not-illustrated microphone and speaker, and the sound control unit 410 mediates a control program of the input and output. The location detection control unit 411 obtains location information of the mobile terminal 105 from a GPS sensor and provides the operating system with the location information.

The image capturing unit 412 captures an image of an object. The image capturing unit 412 executes image-capturing and reading of code information such as a barcode or a two-dimensional code. The CPU 401 analyzes a code information image of a two-dimensional code or the like captured by the image capturing unit 412 and decodes the coded information to obtain. The above-described units are connected to each other through a bus 409. In the present embodiment, as an example of the information processing apparatus, the mobile terminal 105 is described for example; however, it is not limited thereto. For example, various devices with a camera function such as a smartphone, a personal computer, a tablet terminal, a personal digital assistant (PDA), and a digital camera may be used as the information processing apparatus. The information processing apparatus of the present embodiment may be any information processing apparatus as long as it is capable of reading the code information image such as a two-dimensional code and being connected to the Internet.

<Processing Sequence in which Printer Stores Notification Information>

Figure 5:
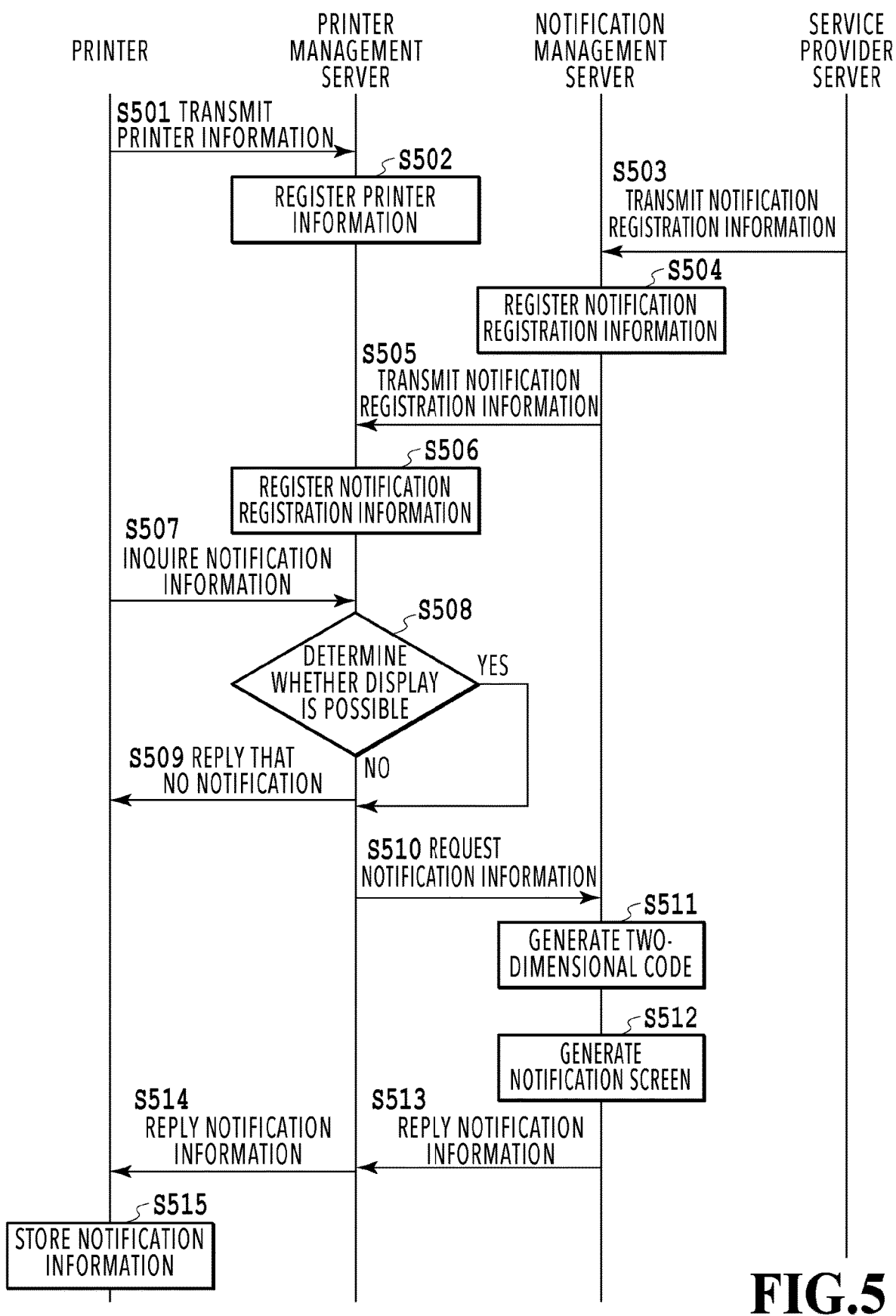
FIG. 5 is a sequence diagram illustrating an example of processing until the printer stores notification information.

FIG. 5 is a sequence diagram illustrating an example of processing that is executed from when the service provider server 103 transmits notification registration information to when the printer 104 stores the notification information. The notification information is information for notifying the user of a service with which the printer 104 is not registered yet, for example. In the present embodiment, if there occurs an event that a manager of the service provider server 103 desires to notify each user of a corresponding printer managed by the printer management server 101, the manager of the service provider server 103 generates the notification registration information. The notification information is then transmitted from the service provider server 103 to the notification management server 102. The notification management server 102 notifies the printer management server 101 of all or a part of the information out of the notification registration information received from the service provider server 103.

Thereafter, the printer management server 101 requests the notification information to the notification management server 102 in response to an inquiry from the printer 104 about whether there is the notification information. In response to the request, the notification information is transmitted to the printer 104 through the notification management server 102 and the printer management server 101. FIG. 5 is a sequence diagram illustrating an example of a series of processing described above. Thereafter, in a predetermined timing, the printer 104 performs display using the notification information (this processing is separately described later in FIG. 10).

The series of processing illustrated as a sequence in FIG. 5 is executed by each CPU of the printer 104, the printer management server 101, the notification management server 102, and the service provider server 103. In other words, the series of processing is performed by the CPU of each device deploying and executing the program code, which is stored in the disk device or the like, in the RAM. Otherwise, a part of or all the functions of the steps in FIG. 5 may be implemented by hardware such as an ASIC or an electronic circuit. A sign "S" in a description of each processing means a step in the sequence diagram. Hereinafter, the CPUs included in the printer 104, the printer management server 101, the notification management server 102, and the service provider server 103 have a central role in each processing. In FIG. 5, the printer 104 is communicable with the printer management server 101 through the router 106 and is connected to the Internet 110.

The present sequence is roughly divided into three phases. The first phase is a phase in which the information on the printer 104 is registered with the printer management server 101. The second phase is a phase in which the notification information is transmitted from the service provider server 103. The third phase is a phase in which the printer 104 requests the notification information and then stores the notification information replied in response to the request into the printer 104. Each phase is performed independently and separately.

First, the first phase is described. In S501, the printer 104 transmits the printer information as information on the printer 104 itself to the printer management server 101. For example, in a case where the user newly purchases the printer 104, the printer 104 receives permission from the user for the connection with the printer management server 101. Once receiving such permission, the printer 104 transmits the printer information to the printer management server 101 in S501. The printer information is information including identification information identifying the printer (for example, a serial number), a model name, product delivery information, and the like. A serial number is used herein as an example of the identification information identifying the printer; however, other information such as a MAC address may be used, or both may be used.

In S502, the printer management server 101 registers the information received in S501 with a printer management table 601 stored in the database 209 of the printer management server 101.

FIGS. 6A and 6B are diagrams illustrating an example of the printer management table 601 stored in the database 209 of the printer management server 101. The printer management server 101 registers the information on the printer 104 received from the printer 104 with the printer management table 601 in association with a registration status with each Web service. In the present embodiment, the printer management server 101 registers the serial number, the model name, and the product delivery information of the printer 104 with the printer management table 601 in association with the registration status with each Web service. FIG. 6A illustrates a value of the printer management table 601 in a case where the printer 104 is registered, and a value indicating not registered is registered as an initial value of the registration status with each Web service. The registration status with each Web service is changed based on information on the registration with the Web service. For example, if the printer 104 is registered with a service A, a value indicating registration is registered as a value of the registration status with the service A as illustrated in FIG. 6B. The processing of registering a service is described later. The processing from S501 to S502 is processing of the first phase in which the information on the printer 104 is registered with the printer management server 101.

Referring back to the sequence in FIG. 5, the second phase in which the notification information is transmitted from the service provider server 103 is described. In S503, the service provider server 103 transmits the notification registration information to the notification management server 102. The notification registration information is notification information on a Web service provided by the service provider server 103 and is information for registering that there is the notification information to be transmitted to the communication apparatus with the notification management server 102. The notification registration information transmitted from the service provider server 103 includes a specific notification ID for each notification information corresponding to the notification registration information. The notification registration information additionally includes an image download uniform resource locator (URL) of the notification information to be displayed on the printer 104 and a Web service name introduced by the and notification information. The notification registration information includes the model name and the product delivery information of the printer 104 that displays the notification information corresponding to the notification registration information, a display format of the notification information, a display timing, display start time, and display end time. The display format of the notification information is a value indicating the number of screens of the notification information, a screen layout, the number and the types of buttons to be displayed on the screen. The display timing is a value indicating the timing to display the notification information on the printer 104 and is, for example, a value indicating the timing of power-on or the like. The display start time and the display end time are an effective period in which the notification is displayed on the printer 104.

In S504, the notification management server 102 registers a part of the notification registration information received in S503 with a notification management table 701 stored in the database 209 of the notification management server 102.

Figure 7:
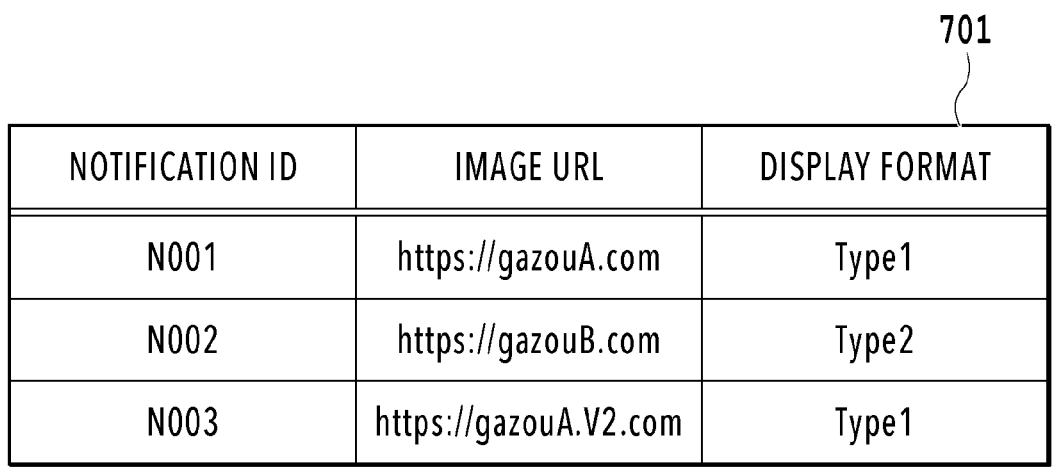
FIG. 7 is a diagram illustrating an example of a notification management table included in a notification management server.

FIG. 7 is a diagram illustrating an example of the notification management table 701 stored in the database 209 of the notification management server 102. The notification management server 102 registers the notification ID, the image download URL, and the display format of the notification information corresponding to the notification registration information received in S503 with the notification management table 701 in association with each other. As described later, the information to be used in a case of replying in response to the request of the printer management server 101 in the third phase is registered with the notification management table 701. Thus, in S504, the notification management server 102 registers the information to be used in the third phase out of the notification registration information received in S503 with the notification management table 701. All the notification registration information received in S503 may be registered with the notification management table 701.

Referring back to the sequence in FIG. 5, the description is continued. In S505, the notification management server 102 transmits the notification registration information received in S503 to the printer management server 101. In this case, the notification registration information including the notification ID of the notification information corresponding to the notification registration information, the model name of the printer 104 that displays the notification information, the Web service name introduced by the notification information, the product delivery, the display format, the display timing, the display start time, and the display end time is transmitted.

In S506, the printer management server 101 registers the notification registration information received in S505 with a notification display model table 801 and a notification information table 802 stored in the database 209 of the printer management server 101.

FIGS. 8A and 8B are diagrams illustrating an example of various tables stored in the database 209 of the printer management server 101. FIG. 8A illustrates the notification display model table 801, and FIG. 8B illustrates the notification information table 802. The notification display model table 801 is a table managing the printer that displays the notification information corresponding to the notification registration information and stores the model name, the product delivery, and the notification ID of the printer that displays the notification information. The notification information table 802 stores the notification ID, the Web service name introduced by the notification information, the display timing, the display format, the display start time, and the display end time. The printer management server 101 registers the notification ID, the model name, and the product delivery of the printer 104 that displays the notification information out of the notification information received in S505 with the notification display model table 801. Additionally, the printer management server 101 registers the notification ID, the Web service name introduced by the notification information, the display format, the display timing, the display start time, and the display end time with the notification information table 802. The above-described processing is the second phase in which the notification registration information is transmitted from the service provider server 103.

Referring back to FIG. 5, the description is continued. Next, the third phase in which the printer 104 requests the notification information and stores the notification information replied in response to the request into the printer 104 is described. The printer 104 performs the processing of the third phase in an arbitrary timing after the printer information is registered with the printer management server 101 in the first phase.

In S507, the printer 104 transmits the serial number, the model name, and the product delivery information (in other words, the printer information) to the printer management server 101 to inquire of the printer management server 101 whether there is the notification information. This and the following processing including the inquiry is performed periodically in an arbitrary timing by the printer 104 in a case where, for example, 24 hours elapses after the last execution. For example, the processing is performed in a timing when the printer 104 is powered on.

In S508, the printer management server 101 determines whether it is possible to display the notification information on the printer 104 based on the serial number, the model name, and the product delivery information received from the printer 104. The present determination is comparable to the determination for controlling whether to execute the notification (display) based on the notification information by the printer 104. If it is determined that the display is impossible, the process proceeds to S509, and a control on the printer 104 to do not execute the notification based on the notification information is executed. On the other hand, if it is determined that the display is possible, the process proceeds to S510, and a control on the printer 104 to execute the notification based on the notification information is executed.

Figure 9:
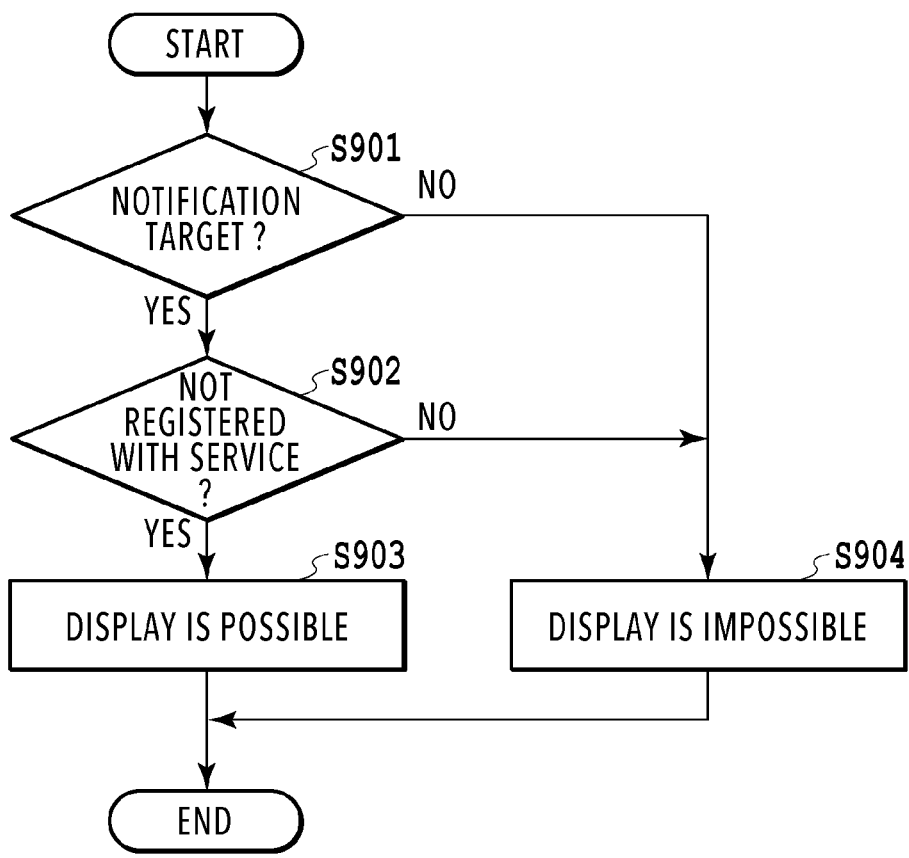
FIG. 9 is a flowchart of processing by the printer management server to determine whether it is possible to display a notification.

FIG. 9 is a flowchart illustrating a flow of the processing by the printer management server 101 in S508 to determine whether it is possible to display the notification. The processing in each step in FIG. 9 is performed by the CPU 201 of the printer management server 101 deploying and executing the program code, which is stored in the ROM 203 or the storage device 204, in the RAM 202.

In S901, the printer management server 101 determines whether the printer 104 is the printer as the notification target. Specifically, the printer management server 101 obtains a notification ID that matches both the model name and product delivery information transmitted from the printer 104 in S507 from the data registered with the notification display model table 801. The printer management server 101 then searches for the obtained notification ID from the notification information table 802 and obtains the data associated with the notification ID from the notification information table 802. If there is the corresponding data, the printer management server 101 determines whether a current clock time of the printer management server 101 is within a period between the display start time and the display end time. If the current clock time is within the period, it is determined that it is the printer as the notification target, and the process proceeds to S902. In other words, if the corresponding data is data within a specified effective period, the process proceeds to S902. If the current clock time is out of the period between the display start time and the display end time, the process proceeds to S904. Also, if there is no corresponding data, the process proceeds to S904. In S904, it is determined that the display is impossible, and the processing ends.

In S902, the printer management server 101 confirms the Web service name associated with the notification ID from the notification information table 802. The printer management server 101 then determines whether the printer 104, which is a printer corresponding to the serial number received in S507, is not registered yet with the Web service introduced by the notification information (corresponding to the notification information) with reference to the printer management table 601. If the registration is not yet, the process proceeds to S903, and it is determined that the display is possible. If the registration is already done, the process proceeds to S904, it is determined that the display is impossible, and the processing ends.

Referring back to FIG. 5, the description is continued. In S509, if it is determined that the display is impossible in S508, the printer management server 101 replies information indicating that there is no notification information to the printer 104. Then, the present sequence ends. In other words, the printer 104 ends the processing without executing the notification based on the notification information.

On the other hand, if it is determined that the display is possible in S508, in S510, the printer management server 101 transmits a request to obtain the notification information to the notification management server 102. Specifically, a request of information on a notification screen to be displayed on the printer 104 is made. The printer management server 101 transmits the obtainment request including the notification ID and the serial number of the printer 104 to the notification management server 102.

In S511, the notification management server 102 generates a URL for the registration with the Web service based on the information included in the request to obtain the notification information and generates a two-dimensional code from the generated URL. In the present embodiment, the notification management server 102 generates a URL for the registration with the Web service, and the URL includes the serial number of the printer 104 received in S510. In other words, the URL for the registration with the Web service includes the serial number of the printer 104 as a character string. For example, the serial number of the printer 104 is included in the URL as a query parameter. Then, the two-dimensional code is generated from the thus-generated URL. The URL is a URL to be used in a case where the mobile terminal 105 accesses the notification management server 102 for the registration with the service. In other words, the URL generated in S511 is a URL managed by the notification management server 102. Additionally, the URL generated in S511 is a URL that allows for identification of the notification ID in a case where there is an access to the URL. That is, in a case where there is an access to the URL generated in S511, the notification management server 102 is able to identify the serial number of the printer 104 and the notification ID.

Next, in S512, the notification management server 102 downloads an image from the image download URL in the notification management table 701 associated with the notification ID included in the obtainment request in S510. The image is an image prepared by the service provider server 103 and is an image including a notification message related to the Web service corresponding to the notification ID. In other words, for example, the image is an image including a message to encourage the user to subscribe the Web service corresponding to the notification ID. The notification management server 102 generates the notification screen based on the generated two-dimensional code, the downloaded image, and the display format registered with the notification management table 701. In the present example, a display format of pasting the two-dimensional code onto the downloaded image is registered with the notification management table 701. Accordingly, the notification management server 102 pastes the two-dimensional code generated in S511 onto the downloaded image to generate a notification information image with the two-dimensional code to be displayed on the printer 104 and stores the notification information image with the two-dimensional code into the storage device 204 of the notification management server 102. The storage destination (access destination) of the notification information image with the two-dimensional code may be an external server or the like.

In S513, the notification management server 102 transmits (replies) the download URL (notification screen information) of the generated notification information image with the two-dimensional code to the printer management server 101 as the notification information (reply information), which is a response to the obtainment request of the notification screen information in S510.

In S514, the printer management server 101 that receives the notification information replies the received notification information to the printer 104 as reply information, which is a response to the inquiry of asking whether there is the notification information in S507. Specifically, first, the printer management server 101 obtains the notification ID used in S510 and S513 and the download URL (access destination) of the notification information image with the two-dimensional code. Additionally, the printer management server 101 obtains the display timing and the display format associated with the notification ID from the notification information table 802. The printer management server 101 then transmits (replies) the notification information including the obtained information to the printer 104.

In S515, the printer 104 stores the notification information replied in S514 into the flash memory 312. In other words, the printer 104 stores the notification information including the notification ID of the notification information, the download URL of the notification information image with the two-dimensional code, the display format, and the display timing. If there is stored notification information that is already obtained in the previous processing, the notification information is overwritten to be stored. The above description is about the third phase in which the printer 104 requests the notification information and stores the notification information replied in response to the request into the printer 104.

In the above-described third phase, there is described an example where the notification management server 102 replies the download URL of the notification information image with the two-dimensional code to the printer management server 101. However, instead of the download URL, entity data of the notification information image with the two-dimensional code may be replied to the printer management server 101. Also, the printer management server 101 may reply entity data of the notification information image with the two-dimensional code to the printer 104 instead of the download URL.

<Processing by Printer to Display Notification Information>

Figure 10:
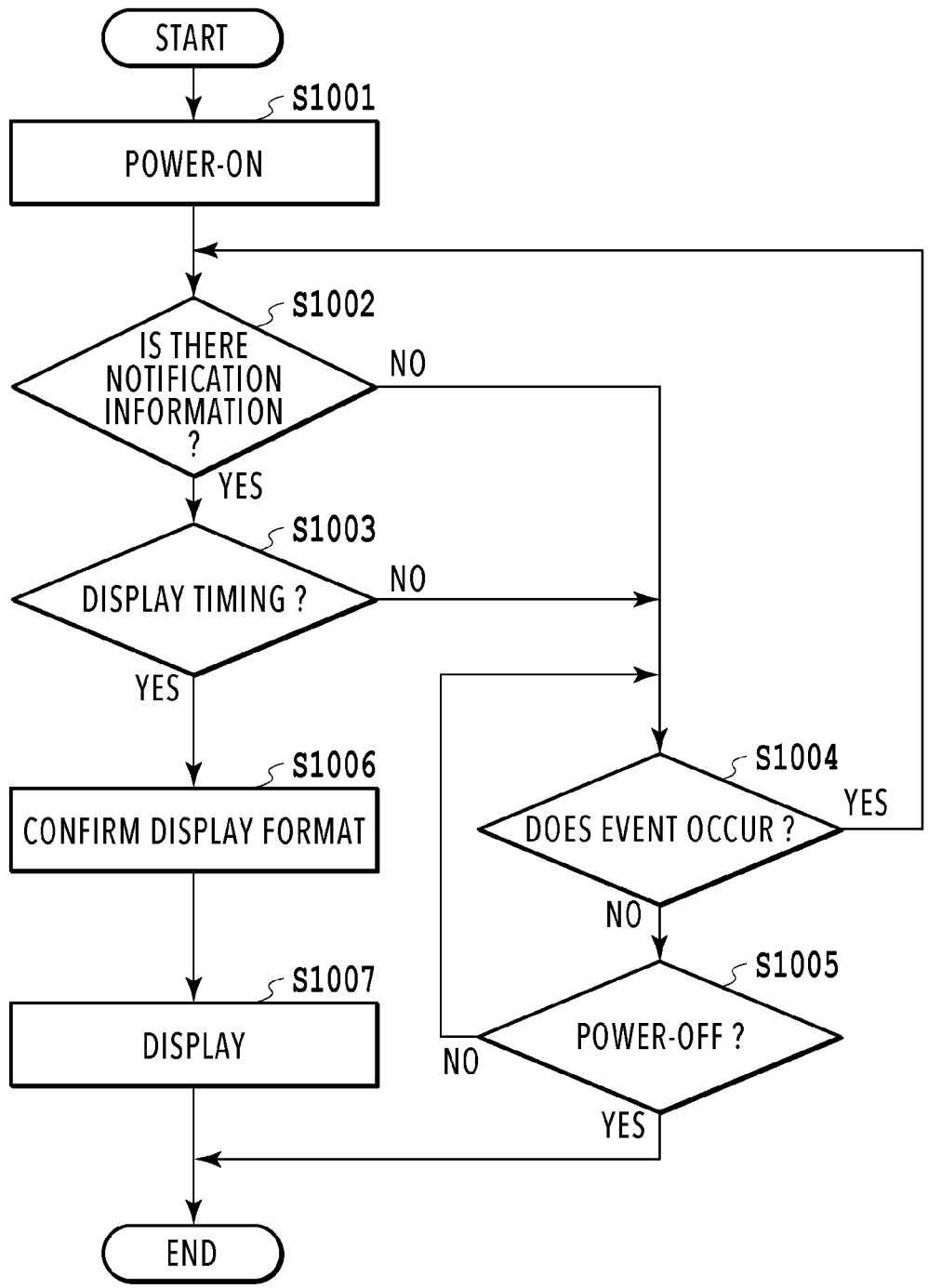
FIG. 10 is a flowchart of processing by the printer to display the notification information.

FIG. 10 is a flowchart illustrating a flow of processing by the printer 104 to confirm whether there is the notification information stored in the flash memory 312 and to display the notification information on the display unit 308. A series of processing illustrated in the flowchart in FIG. 10 is performed by the CPU 305 of the printer 104 deploying and executing the program code, which is stored in the program memory 306 or the like, in the working memory 307. Before the series of processing illustrated in the flowchart in FIG. 10 is started, the printer 104 is in a power-off state. In other words, the processing in FIG. 10 is started once the state of the printer 104 is switched from power-off to power-on.

Once it is detected that a power button is pressed, in S1001, the CPU 305 of the printer 104 puts the printer 104 into the power-on state from the power-off state.

In S1002, the CPU 305 determines whether there is the notification information stored in the flash memory 312. If the notification information is in the flash memory 312, the process proceeds to S1003. If there is no notification information in the flash memory 312, the process proceeds to S1004.

In S1003, the CPU 305 confirms the display timing of the notification information with reference to the notification information stored in the flash memory 312. For example, if it is immediately after the printer 104 is powered on and the display timing of the notification information is "at power-on", it is determined that it is a timing to display the notification information, and the process proceeds to S1006.

As another example, if the last event of the printer 104 is printing and the display timing of the notification information is "at printing complete", it is determined that it is a timing to display the notification information, and the process proceeds to S1006. On the other hand, if the display timing is different from the last event that occurs in the printer 104, the process proceeds to S1004.

An event is something that occurs in a case where printing or copying is performed or in a case where any operation is performed on the printer 104 such as a case where a cover of the printer 104 is opened. In the present embodiment, as the display timing of the notification information, "at power-on" and "at printing complete" are used for example; however, it is not limit thereto, and the display timing of the notification information may be at an operation on a menu screen of the printer 104.

In S1004, the CPU 305 determines whether an event occurs in the printer 104. If occurrence of an event is detected, the process returns to S1002 after the event ends. If no event occurs, the process proceeds to S1005.

In S1005, the CPU 305 detects whether the printer 104 is in the power-off state. If the printer 104 is not in the power-off state, the process returns to S1004. If the printer 104 is in the power-off state, the processing ends.

In S1006, the CPU 305 confirms the display format of the notification information stored in S515. In S1007, the CPU 305 displays the notification information according to the display format confirmed in S1006. Specifically, the CPU 305 accesses the download URL of the notification information image with the two-dimensional code that is stored in S515 to download an image of the notification screen. The CPU 305 then displays the downloaded image on the display unit 308 of the printer 104. The CPU 305 also displays various buttons in a predetermined layout according to the display format.

Figure 11:
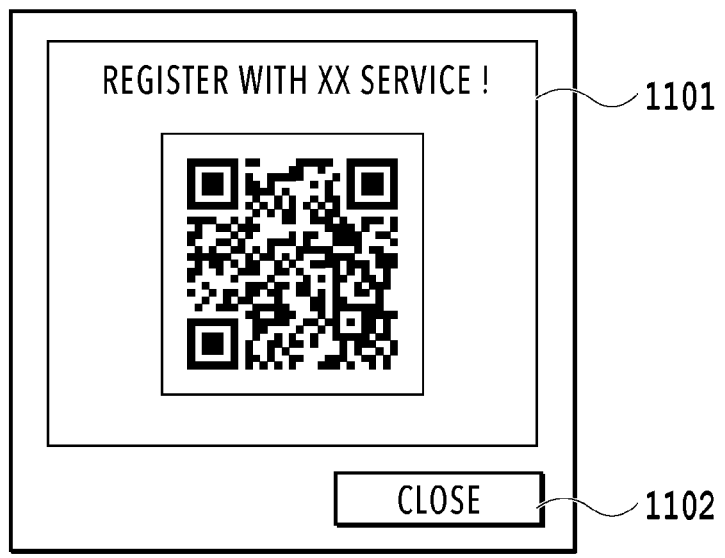
FIG. 11 is a diagram schematically illustrating a screen of the notification information displayed on the printer.

FIG. 11 is a diagram schematically illustrating a main screen 1101 of the notification information displayed on the display unit 308 of the printer 104. On the main screen 1101, the image that is obtained by the CPU 305 of the printer 104 accessing the download URL of the notification information image with the two-dimensional code is displayed. The image includes the two-dimensional code generated by the notification management server 102 as described above, a message to notify of the service with which the printer is able to be registered by the two-dimensional code, and the like. The message is, for example, a message to encourage the user to register the printer with the service with which the printer is able to be registered by the two-dimensional code. It is not limited to this mode and, for example, the image to be displayed may include only the two-dimensional code. As described above, if entity data of the image of the main screen 1101 is stored, the main screen 1101 may be displayed on the display unit 308 by using the entity data (image data).

A close button 1102 is displayed on the display unit 308 of the printer 104. The close button 1102 is a button that is displayed according to the display format confirmed in S1006. On the main screen 1101 of the notification information, the two-dimensional code for the Web service registration is displayed, and once the close button 1102 is pressed, the screen can be closed.

<Processing Until Registration with Web Service is Completed>

Figure 12:
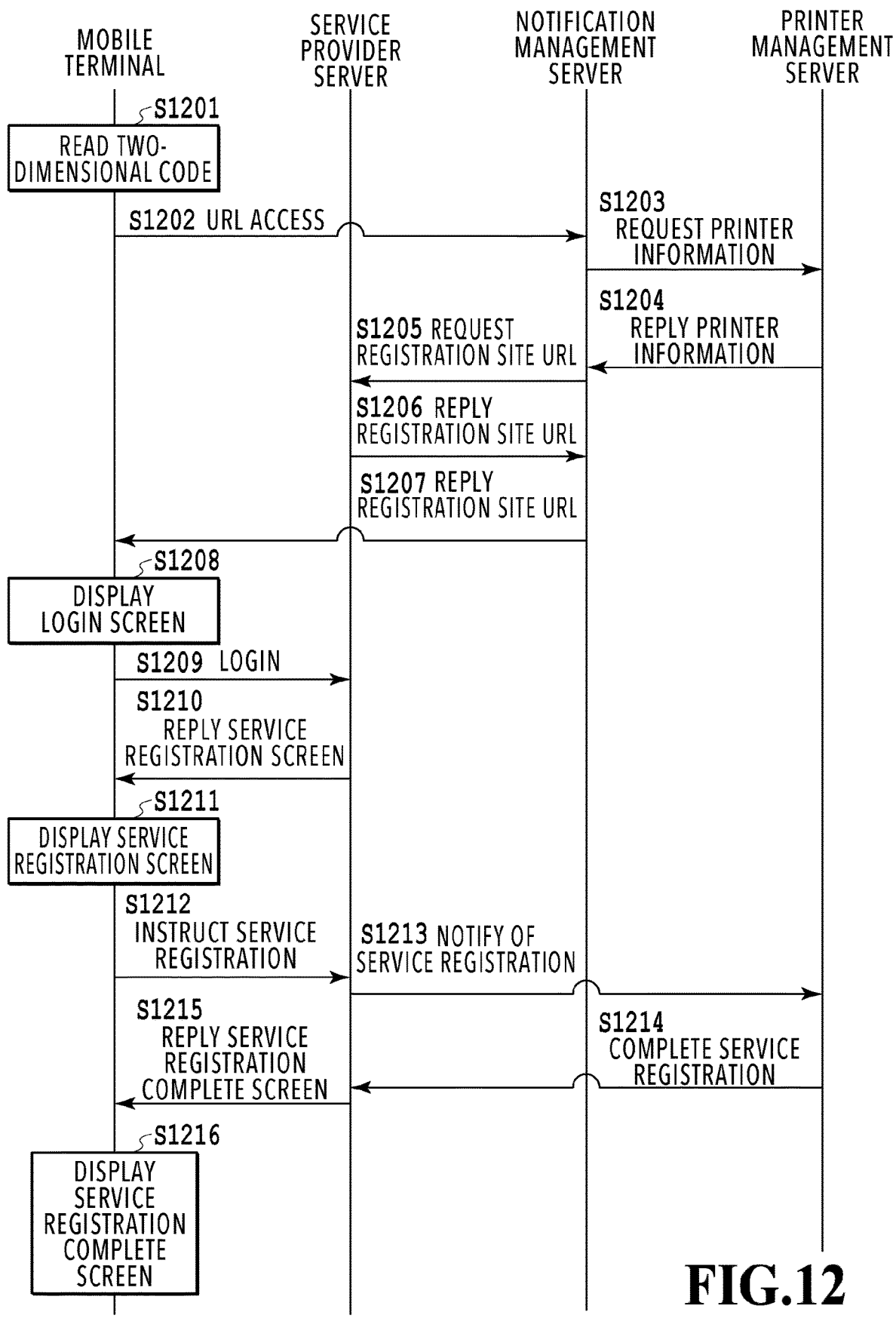
FIG. 12 is a sequence diagram illustrating processing until registration of a Web service is completed.

FIG. 12 is a sequence diagram illustrating an example of processing from when the mobile terminal 105 reads the two-dimensional code displayed on the printer 104 to when the registration of the Web service is completed. A series of processing illustrated as a sequence in FIG. 12 is executed by the mobile terminal 105, the printer management server 101, the notification management server 102, and the service provider server 103. In other words, the series of processing is performed by each CPU of the corresponding device deploying and executing the program code, which is stored in the disk device or the like, in the RAM. Otherwise, a part of or all the functions of the steps in FIG. 12 may be implemented by hardware such as an ASIC or an electronic circuit. Hereinafter, the CPUs included in the mobile terminal 105, the printer management server 101, the notification management server 102, and the service provider server 103 have a central role in each processing.

In S1201, with an operation by the user, the image capturing unit 412 of the mobile terminal 105 reads the two-dimensional code displayed on the display unit 308 of the printer 104. In this case, in the display unit 308 of the printer 104, the two-dimensional code is displayed on the main screen 1101 in FIG. 11, and the image capturing unit 412 reads the two-dimensional code for the Web service registration in the main screen 1101. The mobile terminal 105 then analyzes the read two-dimensional code and obtains various pieces of information embedded in the two-dimensional code. The information obtained in this process is, for example, a URL or the identification information (a serial number) of the printer 104. The reading and analyzing of the two-dimensional code are executed by an application program for a two-dimensional code included in the mobile terminal 105, for example. The application program may be downloaded from the outside using an application store or the like or may be preloaded as default in the mobile terminal 105.

In S1202, the mobile terminal 105 boots a Web browser and accesses the URL embedded in the two-dimensional code read in S1201. As described above, the URL is a URL managed by the notification management server 102 and is also a URL including the serial number of the printer 104.

In S1203, once receiving the access from the mobile terminal 105, the notification management server 102 obtains the serial number of the printer 104 included in the URL. The notification management server 102 recognizes that the access to the URL is for purpose of the registration with the service of the service provider server 103 and also recognizes the target notification ID based on the URL. For this reason, first, the notification management server 102 transmits the obtained serial number to the printer management server 101 and obtains the information required to register the printer 104 with the Web service from the printer management server 101. In other words, in S1203, the notification management server 102 transmits the request to obtain the printer information including the serial number to the printer management server 101.

In S1204, the printer management server 101 obtains the information such as the model name and the product delivery that are associated with the serial number of the printer 104 included in the obtainment request. Additionally, the printer management server 101 generates the registration ID for identifying the printer for the Web service registration. The printer management server 101 then replies the information such as the model name and the product delivery and the printer information including the registration ID to the notification management server 102. The printer management server 101 stores the serial number and the registration ID in association with each other.

In S1205, the notification management server 102 that receives the printer information requests the service provider server 103 to provide the URL of the Web service registration site. In this process, the notification management server 102 transmits the serial number, the model name, and the product delivery of the printer 104 and the printer information including the registration ID to the service provider server 103.

In S1206, the service provider server 103 stores the printer information of the printer 104 received from the notification management server 102 and generates the Web service registration site URL based on the printer information to reply the URL to the notification management server 102.

In S1207, the notification management server 102 replies the Web service registration site URL obtained in S1206 to the mobile terminal 105. In other words, in the mobile terminal 105, once reading the two-dimensional code and accessing the URL, the Web service registration site URL is replied. The URL transmitted from the printer management server 101 is different depending on the identification information transmitted to the printer management server 101. For this reason, since the URL received in this case is the URL generated based on the identification information of the printer 104, the URL is for registering with the service not another printer but the printer 104, which is the printer that transmits the own identification information to the printer management server 101.

In S1208, the mobile terminal 105 accesses the Web service registration site URL through the Web browser and displays a login screen.

Figure 13A:
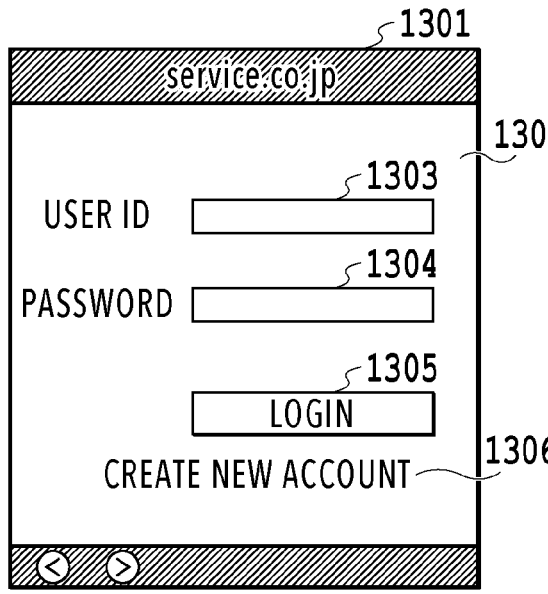
FIGS. 13A to 13C are diagrams illustrating transition of a registration page of the Web service.
Figure 13B:
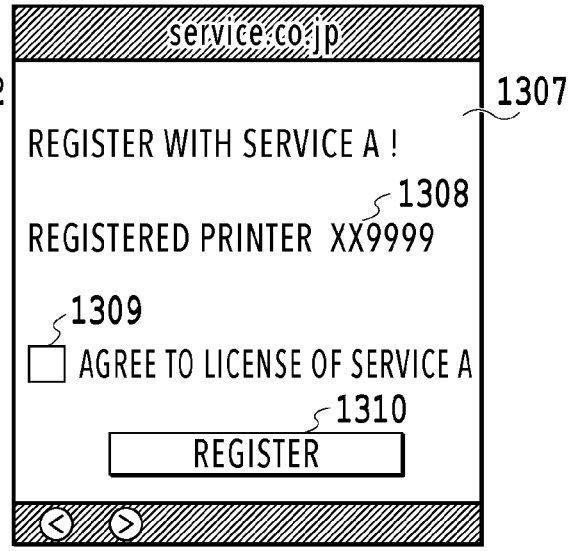
Figure 13C:
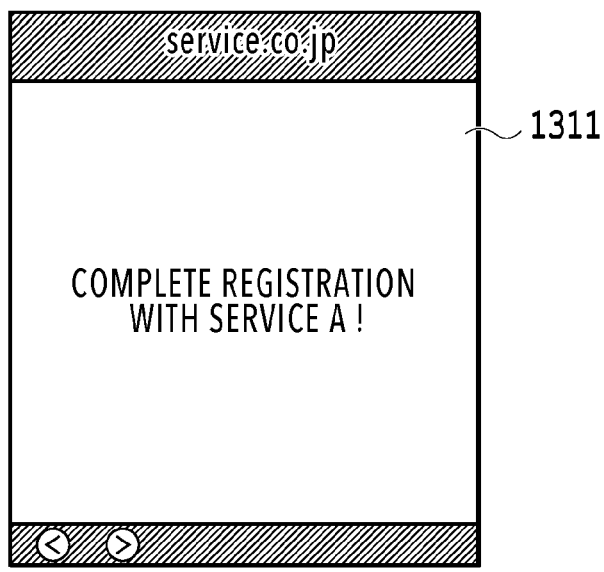

FIGS. 13A to 13C are diagrams illustrating transition of a registration page of the Web service displayed in a Web browser 1301 of the mobile terminal 105. FIG. 13A illustrates a login screen 1302 displayed in S1208. The login screen 1302 includes a user ID input field 1303, a password input field 1304, a login button 1305, and a new account creation URL link 1306. FIG. 13B illustrates a Web service registration screen 1307. The Web service registration screen 1307 includes a registered printer display field 1308, a license check box 1309, and a registration button 1310. FIG. 13C illustrates a Web service registration complete screen 1311 displayed after the Web service registration is completed. FIGS. 13B and 13C are screens that are displayed in processing later.

In S1209, once a user ID and a password are inputted to the login screen 1302 and the login button 1305 is pressed by the user, the login information is transmitted from the mobile terminal 105 to the service provider server 103. In the present embodiment, description is given assuming a state where the user account information is registered in advance with the service provider server 103 by the user. However, a new user account may be created once the login screen 1302 is displayed, and the present processing may be performed thereafter.

In S1210, once confirming the login information and obtaining an appropriate authentication result, the service provider server 103 replies the Web service registration screen 1307 to the browser of the mobile terminal 105.

In S1211, the mobile terminal 105 displays the Web service registration screen 1307 on the Web browser. The serial number of the printer 104 is displayed on the registered printer display field 1308 of the Web service registration screen 1307.

In S1212, the user checks the license check box 1309 of the Web service registration screen 1307 and presses the registration button 1310. Then, a service registration instruction is transmitted from the mobile terminal 105 to the service provider server 103.

In S1213, once detecting that the registration button 1310 is pressed and the service registration instruction is made in S1211, the service provider server 103 makes service registration notification including the registration ID and the Web service name to the printer management server 101.

In S1214, the printer management server 101 obtains the serial number associated with the registration ID received in S1213. As described above, in S1204, the printer management server 101 stores the serial number and the registration ID in association with each other. For this reason, the printer management server 101 can obtain the serial number associated with the registration ID received in S1213. Next, the printer management server 101 confirms the Web service name transmitted from the service provider server 103 and updates the printer management table 601. In other words, as illustrated in FIG. 6B, the printer management server 101 updates the service registration status associated with the concerned serial number of the printer management table 601 to "registered". The printer management server 101 then replies a service registration complete notification to the service provider server 103.

In S1215, the service provider server 103 returns the Web service registration complete screen 1311 to the browser of the mobile terminal 105. In S1216, the mobile terminal 105 displays the Web service registration complete screen 1311 on the Web browser.

The above is the processing until the registration with the Web service is completed. Thereafter, the printer management server 101 receives the status information including the serial number of the printer 104 in a predetermined timing. The printer management server 101 then transmits required information with the registration ID to the service provider server 103 depending on the Web service. Thus, the service is performed on the service provider server 103 as needed.

As described above, according to the present embodiment, the two-dimensional code obtained by encoding the URL including the identification information of the printer 104 is displayed on the printer 104. Once the user reads the two-dimensional code by the image capturing unit 412 of the mobile terminal 105 and accesses the displayed URL through the Web browser, a state where the identification information of the printer 104 is inputted is obtained. In other words, the user does not need to manually input the identification information of the printer 104 in the registration site or the like. Therefore, it is possible to register the printer 104 with the service provided by the service provider server 103 by a simple method.

In the example described in the present embodiment, there is described an example where the printer management server 101 (a first management server) and the notification management server 102 (a second management server) are each formed of a separate information processing apparatus (a server). However, the present embodiment is not limited to such a mode, and the printer management server 101 and the notification management server 102 may be formed of the same single information processing apparatus. In other words, the first management server and the second management server may be provided in the same server apparatus.

Second Embodiment

In the first embodiment, there is described an example where the two-dimensional code of the notification information to be displayed on the printer 104 is generated by the notification management server 102 and is transmitted to the printer 104 through the printer management server 101 receiving the request from the printer 104. In the present embodiment, here is described an example where the two-dimensional code of the notification information to be displayed on the printer 104 is generated by the printer 104. Additionally, although an example of displaying the notification information in a single page is described in the first embodiment, in the present embodiment, an example of displaying the notification information in multiple pages is described. In the present embodiment, the descriptions of details common to the first embodiment are omitted appropriately, and different points from the first embodiment are mainly described.

<Processing Sequence in which Printer Stores Notification Information>

Figure 14:
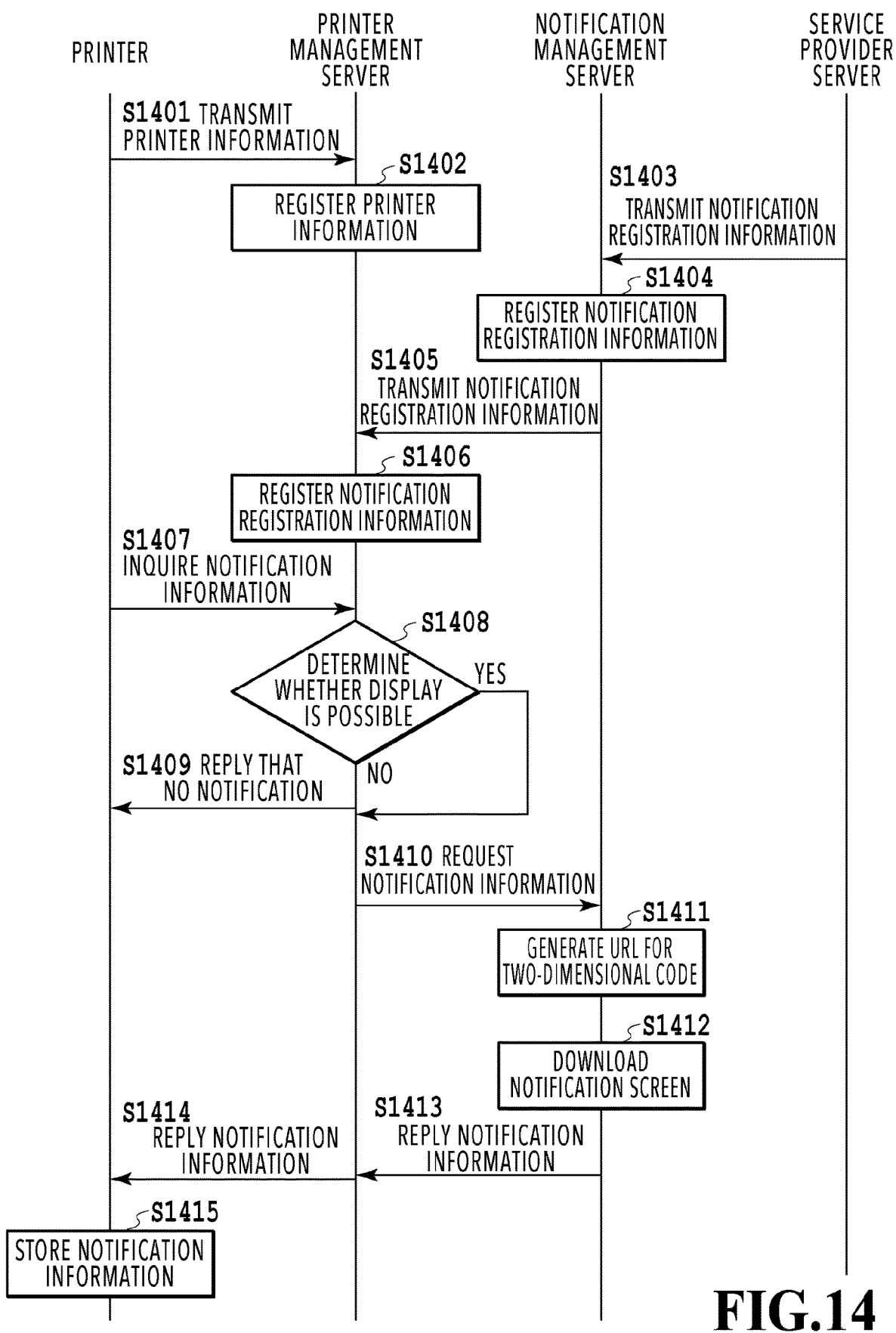
FIG. 14 is a sequence diagram illustrating an example of processing until the printer stores the notification information.

FIG. 14 is a sequence diagram illustrating an example of processing that is executed from when the service provider server 103 transmits the notification information to when the printer 104 stores the notification information. A series of processing illustrated as a sequence in FIG. 14 is executed in the printer 104, the printer management server 101, the notification management server 102, and the service provider server 103. In other words, the series of processing is performed by each CPU of the corresponding device deploying and executing the program code, which is stored in the disk device or the like, in the RAM. Otherwise, a part of or all the functions of the steps in FIG. 14 may be implemented by hardware such as an ASIC or an electronic circuit. Hereinafter, the CPUs included in the printer 104, the printer management server 101, the notification management server 102, and the service provider server 103 have a central role in each processing.

The processing from S1401 to S1410 is similar to the processing from S501 to S510 in FIG. 5; for this reason, the descriptions are omitted. In the present embodiment, the display format included in the notification registration information transmitted from the service provider server in S1403 includes a type of display format that allows for display as described later.

Once receiving the notification information request from the printer management server 101, in S1411, the notification management server 102 generates a URL for a two-dimensional code. The URL for the two-dimensional code in this case is a URL for the registration with the Web service and is a URL including the serial number of the printer 104 obtained in the S1410. In other words, an URL equivalent to the URL for the registration with the Web service that is described in S511 is generated. In the present embodiment, the notification management server 102 performs the processing until the generation of the URL for the two-dimensional code and does not generate the two-dimensional code. As described above, whether to perform the processing performed in the first embodiment or to perform the processing described in the present embodiment is based on the display format specified by the service provider server 103. In the present embodiment, the display format indicating that the two-dimensional code generated by the printer 104 is to be displayed on the printer 104 is specified; for this reason, the notification management server 102 does not generate the two-dimensional code.

In S1412, the notification management server 102 downloads an image from the image download URL associated with the notification ID with reference to the notification management table 701. Additionally, the notification management server 102 stores the downloaded image for the notification screen into the storage device 204 of the notification management server 102 or the like.

In S1413, the notification management server 102 replies the URL for the two-dimensional code generated in S1411 and a URL indicating the storage destination of the image for the notification screen stored in S1412 to the printer management server 101. In other words, in the present embodiment, the notification management server 102 does not generate the two-dimensional code and does not perform processing to synthesize the two-dimensional code with the image for the notification screen.

In S1414, the printer management server 101 replies the notification information in response to the inquiry of the notification information in S1407. The notification information replied in S1414 includes the notification ID, the image download URL, and the URL for the two-dimensional code obtained from S1410 to S1413. The notification information replied in S1414 also includes the information on the display timing and the display format from the notification information table 802 in association with the notification ID. The display format indicates that it is a display format that requires generation of the two-dimensional code by the printer 104. In the present example, the image download URL is described as an URL managed by the notification management server 102; however, the image download URL may be a URL managed by the service provider server 103 as described in the first embodiment.

In S1415, the printer 104 stores the notification information including the notification ID of the notification information, the image download URL, the URL for the two-dimensional code, the display format, and the display timing into the flash memory 312.

<Processing in which Printer Displays Notification Information>

Figure 15:
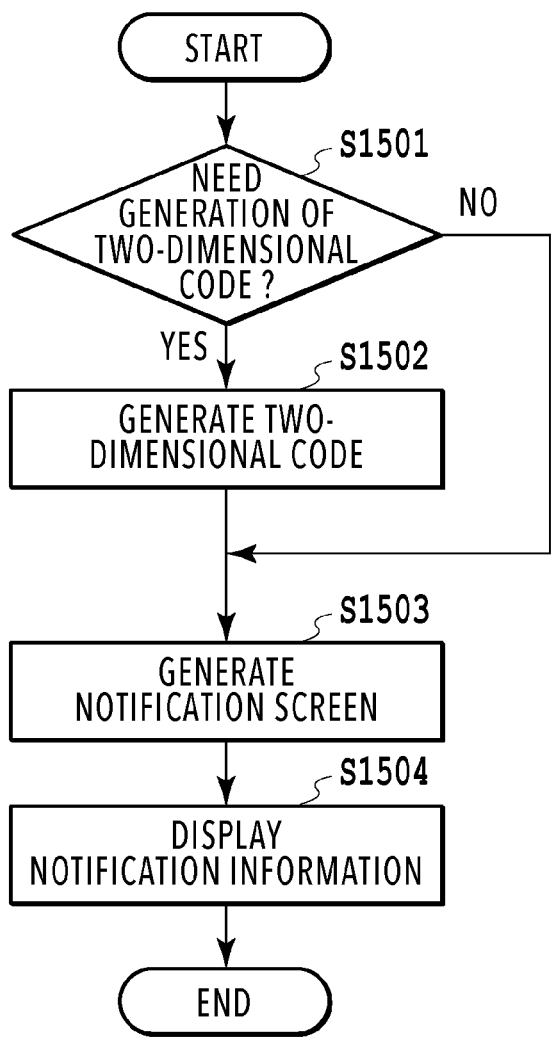
FIG. 15 is a flowchart illustrating a flow of processing by the printer to display the notification information.

FIG. 15 is a flowchart illustrating processing in which the printer 104 displays the notification information. A series of processing illustrated in the flowchart in FIG. 15 is performed by the CPU 305 of the printer 104 deploying and executing the program code, which is stored in the program memory 306 or the like, in the RAM. The series of processing illustrated in the flowchart in FIG. 15 is performed at the start of the display processing in S1007 in FIG. 10. In other words, the processing of FIG. 15 is executed in a timing in which it is determined as the display timing of the notification information in S1003 and the confirmation of the display format is completed in S1006 in FIG. 10.

In S1501, the CPU 305 of the printer 104 confirms the display format that is stored in S1415 and confirmed in S1006 and determines whether the two-dimensional code needs to be generated. If it is determined that the two-dimensional code needs to be generated, the process proceeds to S1502. On the other hand, if it is determined that the two-dimensional code does not need to be generated, the process proceeds to S1503.

In S1502, the CPU 305 generates the two-dimensional code from the URL for the two-dimensional code stored in S1415 and stores the two-dimensional code.

In S1503, the CPU 305 generates the notification screen based on the display format confirmed in S1006. In the present example, the notification screen includes the first page that is the image downloaded from the image download URL stored in S1415 and the second page that is the two-dimensional code generated in S1503. Such a screen layout is specified by the display format.

In S1504, the CPU 305 displays a main screen of the notification information on the display unit 308 of the printer 104.

Figure 16A:
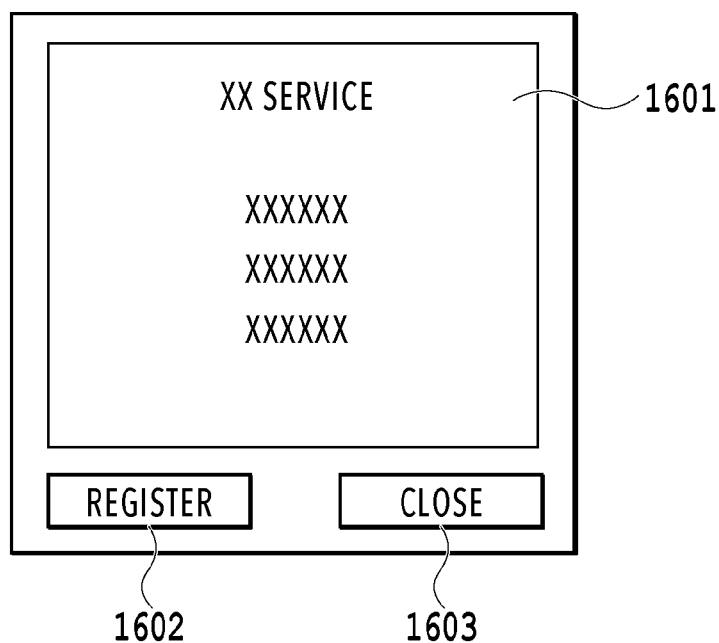
FIGS. 16A and 16B are diagrams illustrating transition of a screen of the notification information displayed on the printer.
Figure 16B:
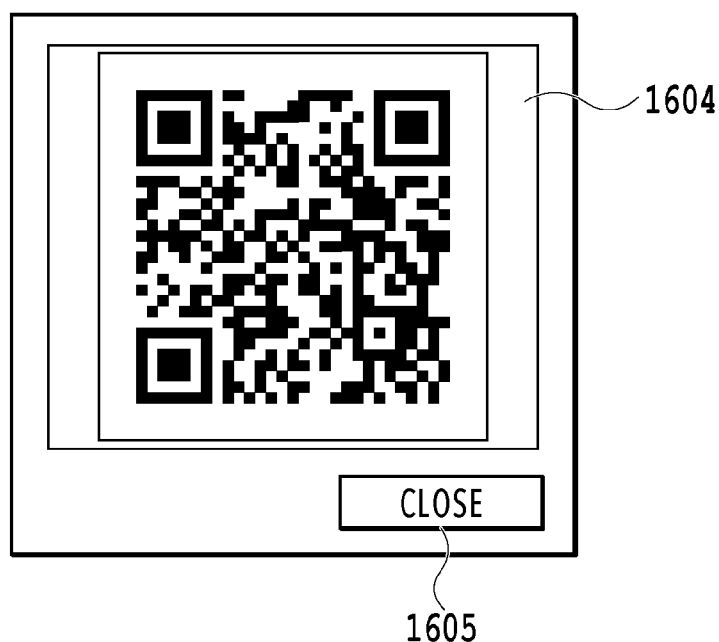

FIGS. 16A and 16B are diagram illustrating transition of the screen of the notification information displayed on the display unit 308 of the printer 104 in the present embodiment. FIG. 16A illustrates a main screen 1601 of the notification information. The main screen 1601 includes a registration button 1602 and a close button 1603. FIG. 16B illustrates a two-dimensional code screen 1604 (a screen in the second page) that is displayed in a case where the registration button 1602 is pressed. The two-dimensional code screen 1604 includes a close button 1605.

The following processing in which the registration is performed by using the mobile terminal 105 is similar to the example described in the first embodiment. The processing of S1503 and S1504 in a case where it is determined that the two-dimensional code does not need to be generated in S1501 is processing similar to the display processing of S1007 described in the first embodiment.

As described above, in the present embodiment, the two-dimensional code to be displayed on the notification screen is generated by the printer 104. The notification information including multiple pages in which the main screen of the notification information and the two-dimensional code are separate from each other is displayed. This makes it possible to display more amount of the information on the Web service than that in the example of the first embodiment on the display unit 308. In the present embodiment, with a predetermined download destination being associated with the registration button 1602, it is possible to display the notification information including multiple pages even with the printer 104 that cannot download and display the image by pressing the registration button 1602.

In the example described in the present embodiment, there is described an example where the printer 104 generates the two-dimensional code at the point to display the notification information. However, the two-dimensional code may be generated and stored at the point to store the notification information and the stored two-dimensional code may be displayed at the display of the notification information.

The display of the notification information including the multiple pages in which the main screen of the notification information and the two-dimensional code are separate from each other, which is described in the present embodiment, may be executed in a mode in which the two-dimensional code is generated by the notification management server 102 as described in the first embodiment.

Third Embodiment

In the present embodiment, here is described a mode in which it is possible to prevent from next time the display of the notification information displayed on the printer. In the present embodiment, the descriptions of details common to the first embodiment are omitted, and different points from the first embodiment are mainly described.

Figure 17A:
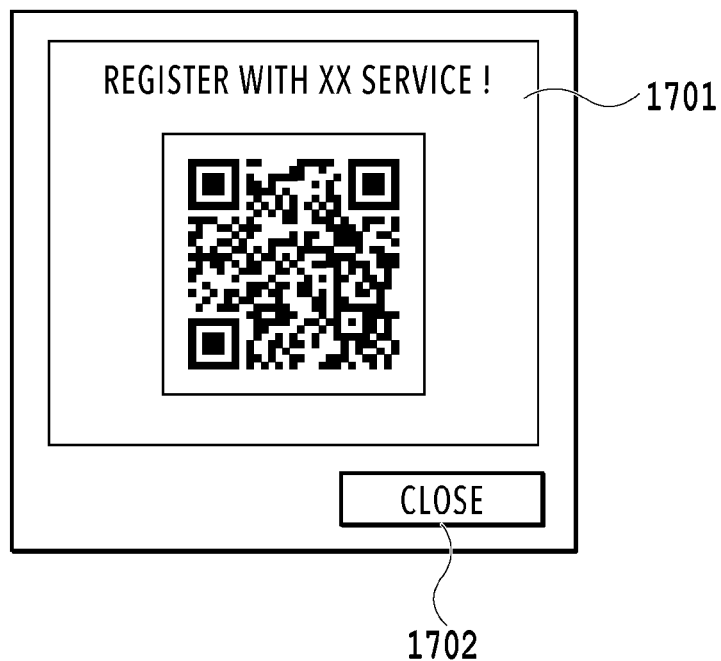
FIGS. 17A and 17B are diagrams illustrating transition of a screen of the notification information displayed on the printer.
Figure 17B:
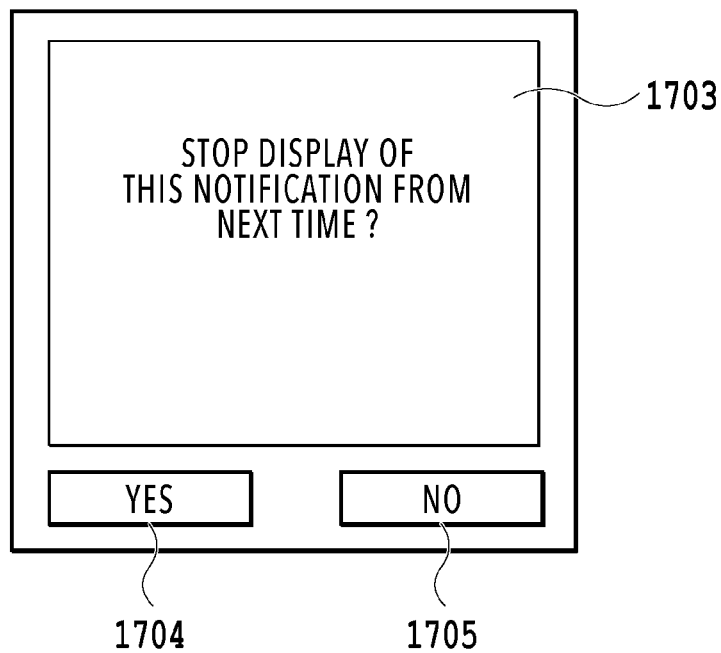

FIGS. 17A and 17B are diagrams illustrating transition of the screen of the notification information displayed on the display unit 308 of the printer 104. FIG. 17A illustrates a main screen 1701 of the notification information. The main screen 1701 includes a close button 1702. FIG. 17B illustrates a display selection screen 1703 for selecting whether to display the notification screen from next time, which is displayed once the close button 1702 is pressed. The display selection screen 1703 includes a "YES" button 1704 to agree to not to display from next time, and a "NO" button 1705 to allow for the display from next time.

Figure 18:
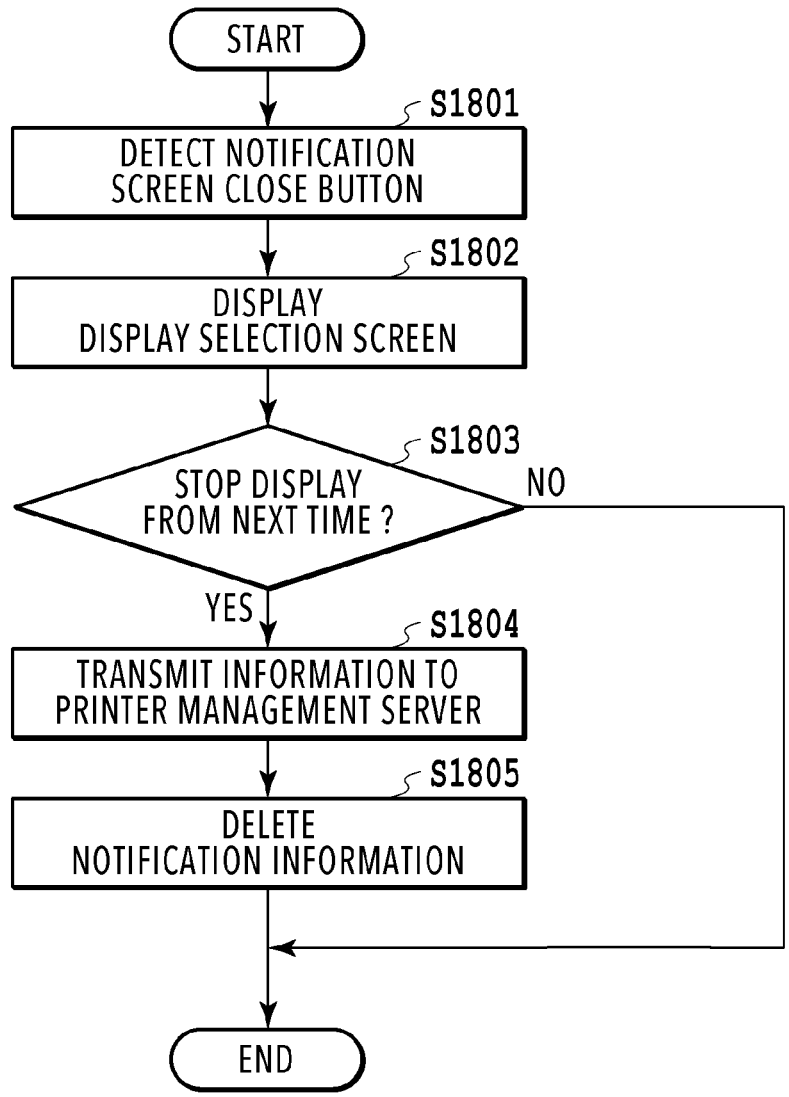
FIG. 18 is a flowchart of processing by the printer to close the screen of the notification information.

FIG. 18 is a flowchart illustrating a flow of processing until the screen of the notification information displayed on the display unit 308 in the printer 104 is closed. A series of processing illustrated in the flowchart in FIG. 18 is performed by the CPU 305 of the printer 104 deploying and executing the program code, which is stored in the program memory 306 or the like, in the RAM.

In S1801, the CPU 305 of the printer 104 detects that the close button 1702 is pressed by the user. In S1802, the CPU 305 displays the display selection screen 1703 on the display unit 308.

In S1803, the CPU 305 determines whether to stop the display of the notification screen from next time. In other words, the CPU 305 detects that which of the "YES" button 1704 and the "NO" button 1705 is pressed by the user on the display selection screen 1703. If the "NO" button 1705 is pressed, the present processing ends. On the other hand, if it is detected that the "YES" button 1704 is pressed, the process proceeds to S1804.

In S1804, the CPU 305 transmits the serial number of the printer 104, the notification ID of the displayed notification information, and information indicating that the display is not made from next time to the printer management server 101. In S1805, the CPU 305 deletes the stored notification information from the flash memory 312.

Figure 19:
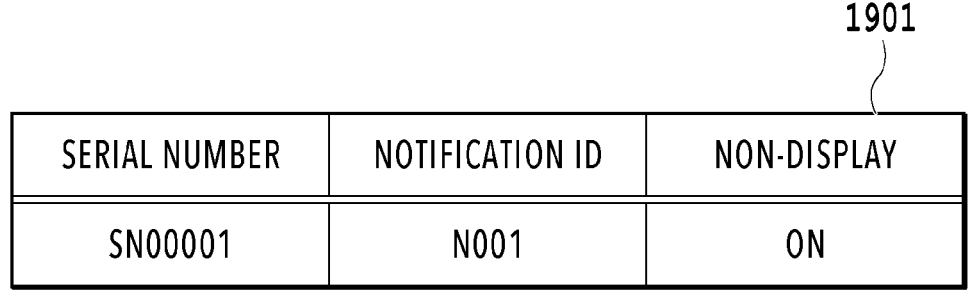
FIG. 19 is a diagram illustrating an example of a management table included in the printer management server.

FIG. 19 is a diagram illustrating an example of a non-display management table 1901 of the notification information that is stored in the database 209 of the printer management server 101. Once receiving the information from the printer 104 in S1805 described above, the printer management server 101 registers the serial number, the notification ID, and the non-display information with the non-display management table 1901 in association with each other.

Figure 20:
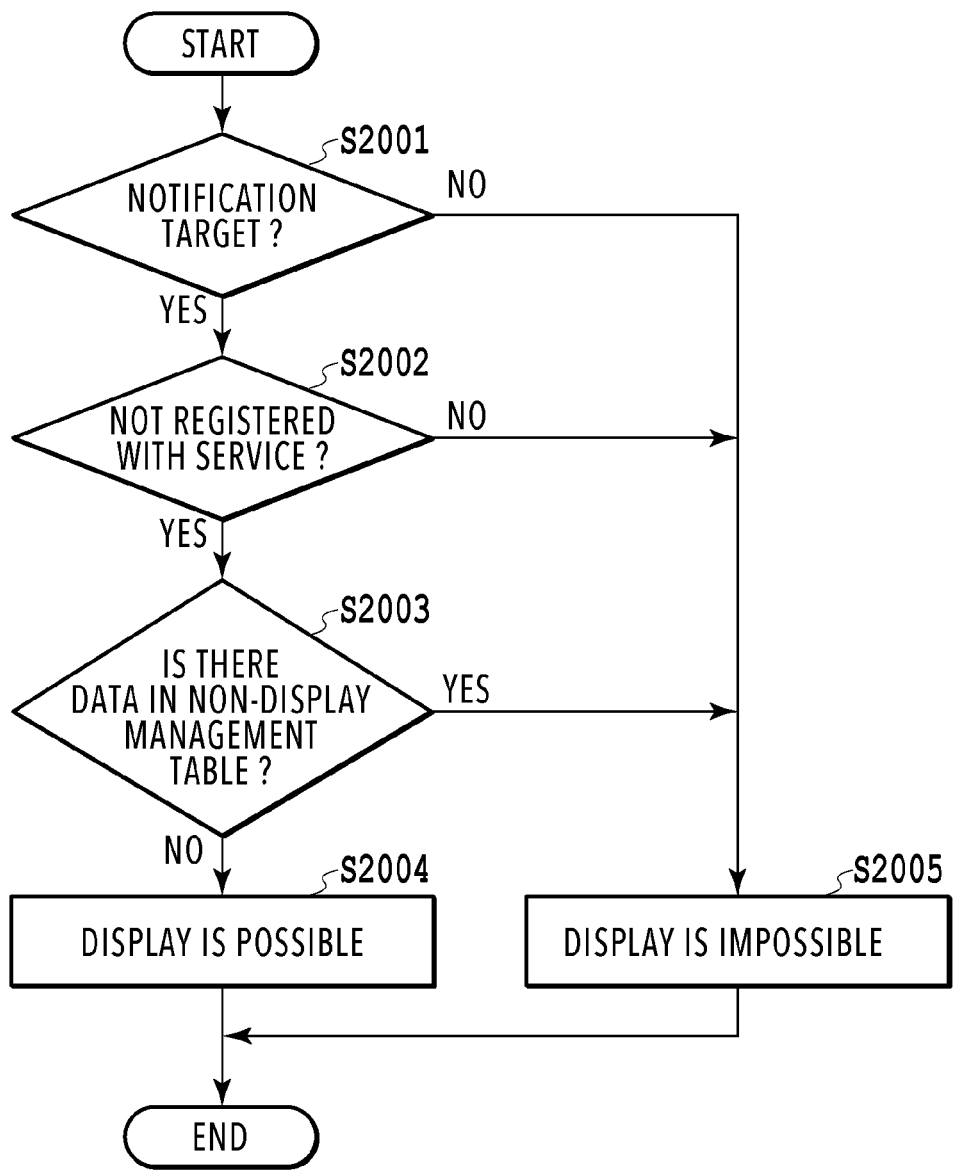
FIG. 20 is a flowchart indicating a flow of processing to determine whether it is possible to display the notification.

FIG. 20 is a flowchart illustrating a flow of processing in which the printer management server 101 determines whether it is possible to display the notification in the present embodiment. The processing in each step in FIG. 20 is performed by the CPU 201 of the printer management server 101 deploying and executing the program code, which is stored in the ROM 203 or the storage device 204, in the RAM 202.

Each processing of S2001, S2002, S2004, and S2005 is similar to the corresponding processing from S901 to S904 in FIG. 9; for this reason, the descriptions are omitted. In the present embodiment, the processing is the same as the processing in FIG. 9 except the processing of S2003 is added for a case where it is determined YES in S2002.

In S2003, the CPU 201 of the printer management server 101 searches for a record including both the serial number received from the printer 104 and the notification ID of the notification information obtained in S2001 from the non-display management table 1901. If there is no corresponding data, the process proceeds to S2004, and it is determined that the display is possible. If there is the corresponding data, the process proceeds to S2005, it is determined that the display is impossible, and the processing ends.

As described above, according to the present embodiment, it is possible to allow the user to select whether to display the notification screen that is displayed on the display unit 308 of the printer 104 from next time. In the present embodiment, the descriptions are given based on the main screen described in the first embodiment; however, the processing may be based on the second embodiment.

Other Embodiments

In the above descriptions, there is described a mode in which the code information is displayed on the printer 104 with the notification information being transmitted from the printer management server 101 to the printer 104; however, it is not limited to the mode. For example, a mode in which the printer 104 is able to display the code information without receiving the notification information from the printer management server 101 may be applied. In this case, the printer 104 holds in advance various pieces of information (the URL for the registration with the Web service and the identification information of the printer) to be read by the mobile terminal 105 using the code information.

Additionally, in the above descriptions, there is described a mode in which the screen based on the notification information is not displayed on the printer 104 in a case where the printer 104 is already registered with the Web service corresponding to the notification ID. However, it is not limited to the mode. For example, in a case where the printer 104 is already registered with the Web service corresponding to the notification ID, the notification management server 102 may not generate the two-dimensional code. Then, the notification management server 102 may generate the notification image based on not the two-dimensional code but the image including the notification message related to the Web service corresponding to the notification ID. The printer 104 that obtains such a notification image may not display the two-dimensional code but display the image including the notification message related to the Web service. Thus, the notification management server 102 may generate a different notification image depending on whether the printer 104 is already registered with the Web service corresponding to the notification information. Based on the control, the printer 104 may display a different screen depending on whether the printer 104 is already registered with the Web service corresponding to the notification information.

Moreover, in the above descriptions, there is described a mode in which the notification information related to the Web service with which the printer 104 can be registered is registered with the printer management server 101, and as a result, the notification based on the notification information related to the concerned Web service is executed by the printer 104. However, notification information other than the notification information related to the concerned Web service may be registered with the printer management server 101. In other words, a notification based on the notification information other than the notification information related to the concerned Web service may be executed by the printer 104. The notification information other than the notification information related to the concerned Web service is, for example, a notification related to an application program for printing that is installable into the mobile terminal 105. More specifically, the notification information is a notification to encourage the user to use the application program for printing and to encourage the user to execute printing using the application program for printing. As described above, depending on whether the printer 104 is already registered with the Web service, the execution of the notification based on the notification information related to the Web service is controlled, or the contents of the notification are controlled to be changed. However, the notification based on the notification information other than the notification information related to the concerned Web service may have a mode in which the notification is surely executed regardless of whether the printer 104 is already registered with the Web service.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-110124, filed Jul. 1, 2021, which is hereby incorporated by reference wherein in its entirety.

What is claimed is:

1. An information processing system, comprising:
a communication apparatus;
a first management server configured to manage status information transmitted from the communication apparatus through a network;
a service provider server configured to provide a service based on the status information; and
a second management server configured to perform registration with the service, wherein
the second management server includes
a reception unit configured to receive a request of notification information, which includes identification information identifying the communication apparatus, from the first management server,
a generation unit configured to generate a URL for service registration based on the identification information in a case where the request is received,
a transmission unit configured to transmit reply information, which includes the generated URL, to the first management server as a response to the request, and
a second transmission unit configured to transmit a request of registration with the service, which includes the identification information, to the service provider server in response to an access to the URL.

2. The information processing system according to claim 1, wherein the second management server further includes:
a second reception unit configured to receive notification information from the service provider server; and
a registration unit configured to register the received notification information,
wherein the notification information received from the service provider server includes information on an access destination to an image of a notification screen,
the generation unit generates a two-dimensional code by encoding the generated URL, obtains the image of the notification screen by using the information on the access destination included in the registered notification information, and generates an image including the two-dimensional code by using the obtained image of the notification screen, and
the reply information transmitted by the transmission unit includes the access destination to the generated image.

3. The information processing system according to claim 1, wherein the second management server further includes:
a second reception unit configured to receive notification information from the service provider server; and
a registration unit configured to register the received notification information,
wherein the notification information received from the service provider server includes information on an access destination to an image of a notification screen,
the generation unit generates a two-dimensional code by encoding the generated URL, obtains the image of the notification screen by using the information on the access destination included in the registered notification information, and generates an image including the two-dimensional code by using the obtained image of the notification screen, and the reply information transmitted by the transmission unit includes the generated image.

4. The information processing system according to claim 1, wherein the second management server further includes:
a second reception unit configured to receive notification information from the service provider server; and
a registration unit configured to register the received notification information,
wherein the notification information received from the service provider server includes information on an access destination to an image of a notification screen,
the generation unit obtains the image of the notification screen by using the information on the access destination included in the registered notification information, and
the reply information transmitted by the transmission unit includes the URL generated by the generation unit and the access destination to the image obtained by the generation unit.

5. The information processing system according to claim 1, wherein
the communication apparatus transmits an inquiry of the first management server whether there is a notification in a predetermined timing, the inquiry including the identification information, and
in a case where there is the inquiry from the communication apparatus and there is a notification to be displayed on the communication apparatus, the first management server requests the notification information, which includes the identification information, to the second management server and replies the reply information, which is replied in response to the request, to the communication apparatus.

6. The information processing system according to claim 5, wherein
the second management server further includes
a second reception unit configured to receive notification information of the service from the service provider server,
a registration unit configured to register the received notification information, and
a second transmission unit configured to transmit information that is a part of the received notification information to the first management server, and
the generation unit generates the URL in a case where the request of the registered notification information is received from the first management server.

7. The information processing system according to claim 6, wherein
the information that is a part of the notification information includes a model name and delivery information corresponding to the service, and
in a case where there is a notification corresponding to the model name and the delivery information of the communication apparatus that makes the inquiry, the first management server determines that there is a notification to be displayed on the communication apparatus.

8. The information processing system according to claim 6, wherein
the information that is a part of the notification information includes a timing for the communication apparatus to confirm a notification, and
in a case where the timing matches a state of the communication apparatus, the first management server determines that there is a notification to be displayed on the communication apparatus.

9. The information processing system according to claim 6, wherein
the information that is a part of the notification information includes information on a period in which the communication apparatus displays a notification, and
in a case where it is within the period to display the notification, the first management server determines that there is a notification to be displayed on the communication apparatus.

10. The information processing system according to claim 5, wherein
the communication apparatus includes a display unit, and in a case where there is a service with which the communication apparatus is not registered yet, displays a URL, which includes own identification information and is a URL for registration with the service, on the display unit based on the reply information from the first management server.

11. The information processing system according to claim 1, wherein
in response to an access to the URL, the second transmission unit requests a registration ID using for the service in the communication apparatus to the first management server and transmits a request of registration with the service, which includes the registration ID replied from the first management server in response to the request and the identification information, to the service provider server.

12. The information processing system according to claim 11, wherein
the first management server generates the registration ID in response to the request of the registration ID from the second management server, manages the generated registration ID and the identification information in association with each other, and, in a case where completion of registration with the service is notified by the service provider server, updates registration information of the service in the communication apparatus.

13. The information processing system according to claim 1, wherein
in a case where the communication apparatus is already registered with the service, a control is made such that display based on the generated URL is not performed in the communication apparatus, and in a case where the communication apparatus is not registered with the service, a control is made such that display based on the generated URL is performed in the communication apparatus.

14. The information processing system according to claim 1, wherein
in a case where the communication apparatus is already registered with the service, a control is made such that display based on the generated URL is not performed in the communication apparatus but display of a notification message related to the service is performed, and in a case where the communication apparatus is not registered with the service, a control is made such that display based on the generated URL and display of the notification message are performed in the communication apparatus.

15. An information processing method in an information processing system including a communication apparatus, a first management server configured to manage status information transmitted from the communication apparatus through a network, a service provider server configured to provide a service based on the status information, and a second management server configured to perform registration with the service, wherein the second management server executes:

receiving a request of notification information, which includes identification information identifying the communication apparatus, from the first management server;

generating a URL for service registration based on the identification information in a case where the request is received;

transmitting reply information, which includes the generated URL, to the first management server as a response to the request; and transmitting a request of registration with the service, which includes the identification information, to the service provider server in response to an access to the URL.

* * * * *